(12) United States Patent
Kamada et al.

(10) Patent No.: US 11,427,088 B2
(45) Date of Patent: Aug. 30, 2022

(54) MOVABLE STRUCTURE DRIVING UNIT

(71) Applicant: Kanzaki Kokyukoki Mfg. Co., Ltd., Hyogo (JP)

(72) Inventors: Tatsuya Kamada, Hyogo (JP); Michio Tsukamoto, Hyogo (JP); Masaru Iida, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 581 days.

(21) Appl. No.: 16/454,636

(22) Filed: Jun. 27, 2019

(65) Prior Publication Data
US 2020/0009969 A1    Jan. 9, 2020

(30) Foreign Application Priority Data

Jul. 9, 2018   (JP) .............................. JP2018-130130
Jul. 9, 2018   (JP) .............................. JP2018-130135
Jul. 9, 2018   (JP) .............................. JP2018-130149

(51) Int. Cl.
*B60L 15/20*       (2006.01)
*B60K 17/356*    (2006.01)
*B60L 50/50*       (2019.01)
*B60G 3/20*         (2006.01)

(52) U.S. Cl.
CPC ............... *B60L 15/20* (2013.01); *B60G 3/20* (2013.01); *B60K 17/356* (2013.01); *B60L 50/50* (2019.02); *B60L 2240/26* (2013.01); *B60L 2240/421* (2013.01); *B60L 2240/461* (2013.01); *B60L 2240/64* (2013.01)

(58) Field of Classification Search
CPC ...... B60L 15/20; B60L 50/50; B60L 2240/26; B60L 2240/421; B60L 2240/461; B60L 2240/64; B60G 3/20; B60K 17/356
USPC .......................................................... 701/22
See application file for complete search history.

(56) References Cited

U.S. PATENT DOCUMENTS

| | | | |
|---|---|---|---|
| 7,726,430 B2* | 6/2010 | Yang ........................ | B60K 6/52 180/242 |
| 2008/0254936 A1* | 10/2008 | Yang ..................... | B60K 17/346 477/5 |
| 2017/0120899 A1 | 5/2017 | Sugimoto et al. | |
| 2018/0136248 A1* | 5/2018 | Tomura .................. | B60T 8/171 |

FOREIGN PATENT DOCUMENTS

JP           2017087824 A      5/2017

* cited by examiner

*Primary Examiner* — Gertrude Arthur Jeanglaude
(74) *Attorney, Agent, or Firm* — Cantor Colburn LLP

(57) ABSTRACT

A movable structure driving unit is a movable structure driving unit used for a movable structure, including: an electric motor that is electrically connected to a power supply and that drives a front wheel; a rear-side motive power source that drives a rear wheel; a jump detector that detects a jump of the front wheel from ground; and a motor controller that controls driving of the electric motor. The motor controller stops supply of a driving current from the power supply to the electric motor when the jump of the front wheel from the ground is detected in a state in which driving of the front wheel and the rear wheel is instructed.

10 Claims, 36 Drawing Sheets

|  | START OF TRAVEL | LOW-SPEED TRAVEL | HIGH-SPEED TRAVEL |
|---|---|---|---|
| FRONT WHEELS | ○ | ○ | × |
| REAR WHEELS | × | ○ | ○ |

FIG. 14

MOVABLE STRUCTURE DRIVING UNIT

CROSS REFERENCE TO RELATED APPLICATIONS

The present application claims priority under 35 U.S.C. § 119 to Japanese Patent Application Nos. 2018-130130, 2018-130135, and 2018-130149, all filed on Jul. 9, 2018, the entire content of which are incorporated herein by reference.

TECHNICAL FIELD

The present disclosure relates to a movable structure driving unit which is used for a movable structure having a front wheel and a rear wheel, and in particular to protection of a driving mechanism of the front wheel regardless of jump during travel. The present disclosure also relates to a movable structure driving unit which is used for a movable structure having a front wheel and a rear wheel, and in particular to improving stability of travel on a soft road surface. The present disclosure further relates to a movable structure driving unit which is used for a movable structure having a wheel at each of front and rear sides in a driving direction, and in particular to prevention of stopping of an engine due to excessive load and to improvement of fuel consumption.

BACKGROUND

In the related art, as described in JP 2017-87824 A, a structure is known in which an engine is mounted at a rear side of a vehicle, and a motive power of the engine is transmitted to a rear wheel via an axle driving apparatus. The axle driving apparatus includes a motor and an input shaft. The motive power of the engine can be input to one end side of the input shaft, and a motive power of the motor can be input to the other end side of the input shaft. The motive power of the input shaft is transmitted to the axle of the rear wheel via a gear-type transmission. The motive power of the motor is transmitted to an output shaft via a clutch. The motive power of the output shaft is transmitted to the axle of the front wheel via a PTO shaft, a motive power transmission shaft (propeller shaft), or the like. With this process, a four-wheel drive is enabled in which the rear wheel is driven by the motive power of the engine and the front wheel is driven by the motive power of the motor by connection of the clutch.

In the vehicle described in JP 2017-87824 A, there may be cases where the vehicle jumps in a manner to be lifted off from the ground during high-speed traveling on a rough terrain with the four-wheel drive or the like. In this case, when the vehicle lands on the ground after the vehicle jumps, the high-speed rotation of the front wheel is rapidly suppressed by the ground, and an excessive impact is applied to the driving mechanism of the front wheel. Due to the excessive impact, the strength of the front-wheel driving mechanism may become insufficient or endurance of the driving mechanism may be reduced. On the other hand, increasing the strength of the front-wheel driving mechanism may result in an increase in the size of the front-wheel driving mechanism or an excessive increase of the cost.

In addition, in the vehicle described in JP 2017-87824 A, during travel of a soft road surface such as a swamp, a damp ground, or the like with the four-wheel drive, because the transmission of the motive power of the front wheel to the ground is reduced, it becomes easier for the front wheel to swing left and right according to the topography of the ground. Because of this, the vehicle may fail to travel stably in an intended direction of travel of a driver who is a user, such as a forward direction of a straight movement or the like.

In a movable structure such as a vehicle in which, of the front and rear wheels, a first wheel such as the front wheel is driven by a motor, and a second wheel such as the rear wheel is driven by the engine, if an excessive load is applied to the engine during a period in which only the second wheel is driven and driving of the first wheel by the motor is stopped, there may be cases where the engine stops or the fuel consumption is degraded.

An advantage of the present disclosure lies in provision of a movable structure driving unit which can suppress an increase in the size and cost of the driving mechanism which drives the front wheel and which can protect the driving mechanism of the front wheel regardless of the jump during travel.

Another advantage of the present disclosure lies in provision of a movable structure driving unit which can improve stability of soft road surface traveling of a movable structure of a four-wheel drive, according to an instruction of a user.

Yet another advantage of the present disclosure lies in provision of a movable structure driving unit which can prevent stopping of the engine due to excessive load and which can improve fuel consumption, in a movable structure which drives the wheel by the engine.

SUMMARY

According to one aspect of the present disclosure, there is provided a movable structure driving unit of a first structure, which is used for a movable structure having a front wheel and a rear wheel, comprising: an electric motor that is electrically connected to a power supply and that drives the front wheel; a rear-side motive power source that drives the rear wheel; a jump detector that detects a jump of the front wheel from ground; and a motor controller that controls driving of the electric motor, wherein the motor controller stops supply of a driving current from the power supply to the electric motor when the jump of the front wheel from the ground is detected in a state in which driving of the front wheel and the rear wheel is instructed.

According to another aspect of the present disclosure, there is provided a movable structure driving unit of a second structure, which is used for a movable structure having a front wheel and a rear wheel, comprising: an electric motor that is electrically connected to a power supply and that drives the front wheel; a rear-side motive power source that drives the rear wheel; a detector that detects a change of a weight of a part of the movable structure, acting on a suspension device; and a motor controller that controls driving of the electric motor, wherein the motor controller stops supply of a driving current from the power supply to the electric motor when an amount of reduction of the weight detected by the detector is greater than or equal to a predetermined value in a state in which driving of the front wheel and the rear wheel is instructed.

According to another aspect of the present disclosure, there is provided a movable structure driving unit of a third structure, which is used for a movable structure having a front wheel and a rear wheel, comprising: an electric motor that drives the front wheel; a rear-side motive power source that drives the rear wheel; a mode instructor that instructs switching between a hard road surface mode suited for travel on a hard road surface and a soft road surface mode suited for travel on a soft road surface; and a control device that controls driving of the electric motor and the rear-side motive power source according to an operation of an acceleration instructor which instructs acceleration by an operation of a user, wherein the control device applies a control to match a rotational speed of the front wheel to a rotational speed of the rear wheel when the hard road surface mode is instructed by the mode instructor, and applies a control to set the rotational speed of the front wheel higher than the rotational speed of the rear wheel when the soft road surface mode is instructed by the mode instructor.

According to another aspect of the present disclosure, there is provided a movable structure driving unit of a fourth structure, which is used for a movable structure having a wheel at each of a front side and a rear side of a direction of travel, comprising: an electric motor that drives, of a plurality of the wheels, a first wheel on a first side in a front-and-rear direction; an engine that drives, of the plurality of the wheels, a second wheel on a second side in the front-and-rear direction; a load detector that detects a load of the engine; and a motor controller that controls driving of the electric motor, wherein the motor controller drives the electric motor to drive both of the first wheel and the second wheel when a detected value of the load detector becomes greater than or equal to a first predetermined value in a state in which a two-wheel drive is instructed in which driving of the first wheel by the electric motor is stopped and the second wheel is driven.

BRIEF DESCRIPTION OF DRAWINGS

Embodiment(s) of the present disclosure will be described based on the following figures, wherein:

FIG. 14 is a diagram showing drive states of a front wheel and a rear wheel during start of travel, a low-speed travel, and a high-speed travel of a vehicle in an alternative configuration of an embodiment of the present disclosure;

DESCRIPTION OF EMBODIMENTS

Figure 1:
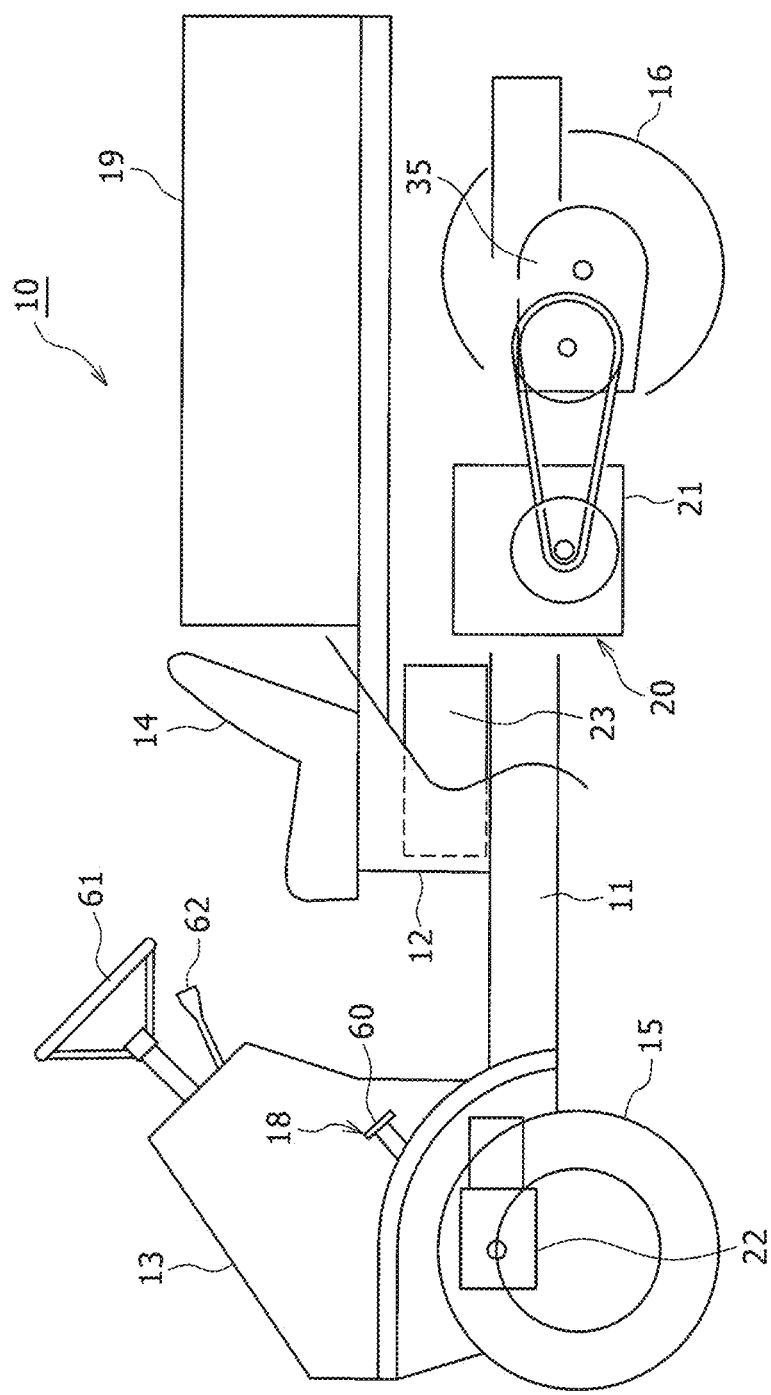
FIG. 1 is a side view of a vehicle on which a movable structure driving unit according to an embodiment of the present disclosure is mounted.

An embodiment of the present disclosure will now be described with reference to the drawings. In the following description, a case is described in which a movable structure on which a movable structure driving unit is mounted is an off-road utility vehicle having a carriage and which travels on rough terrain such as forests, wastelands, rocky mountains, or the like, but alternatively, the movable structure may be a work vehicle having a working machine which executes at least one type of work among snow removal work, excavation work, civil work, and agricultural work, an all terrain vehicle (ATV), or a recreational vehicle (ROV). In the following, elements similar throughout all drawings are assigned the same reference numerals.

Figure 2:
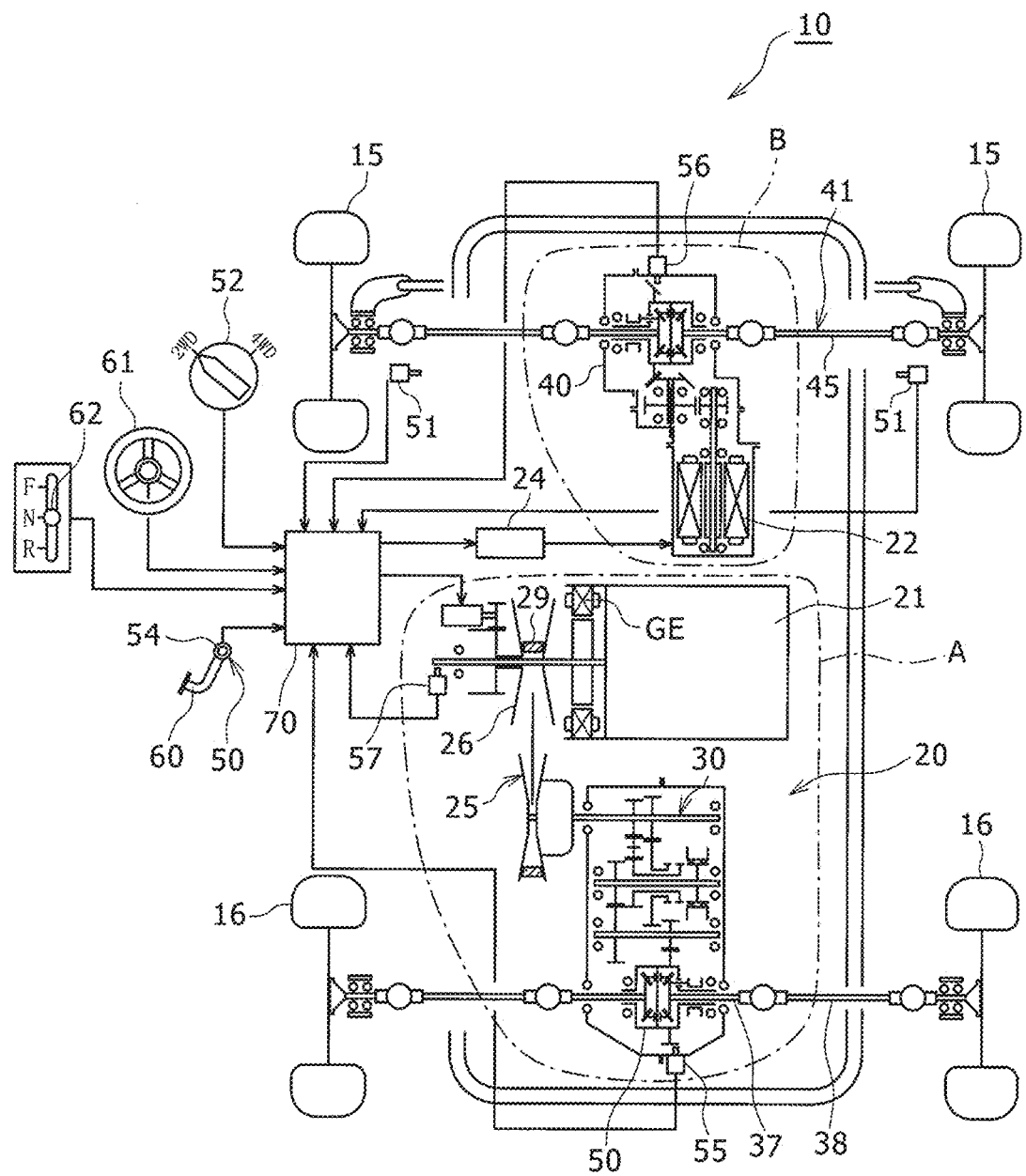
FIG. 2 is a diagram showing an overall structure of a movable structure driving unit mounted on the vehicle of FIG. 1.
Figure 3:
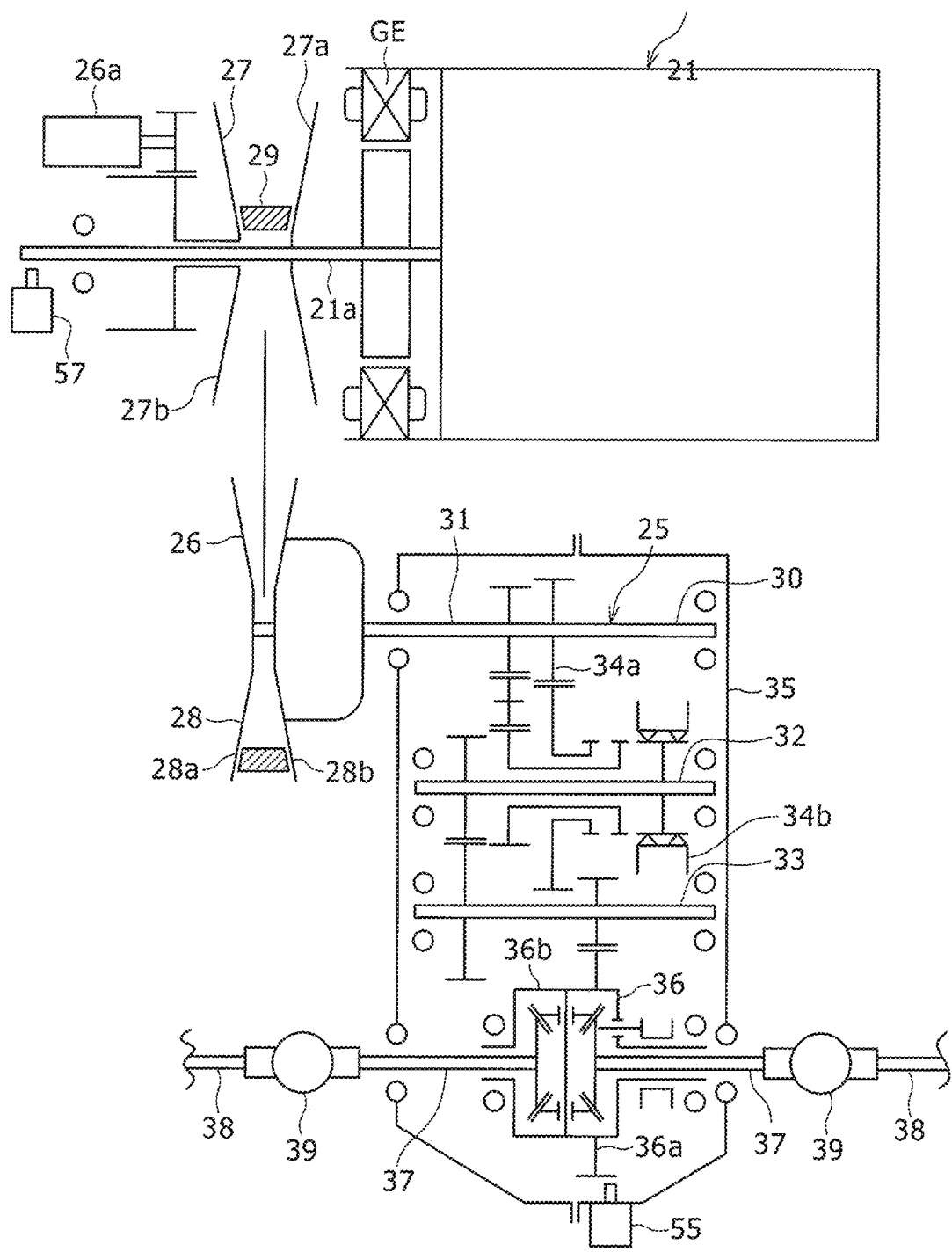
FIG. 3 is an enlarged view of an A part of FIG. 2.
Figure 4:
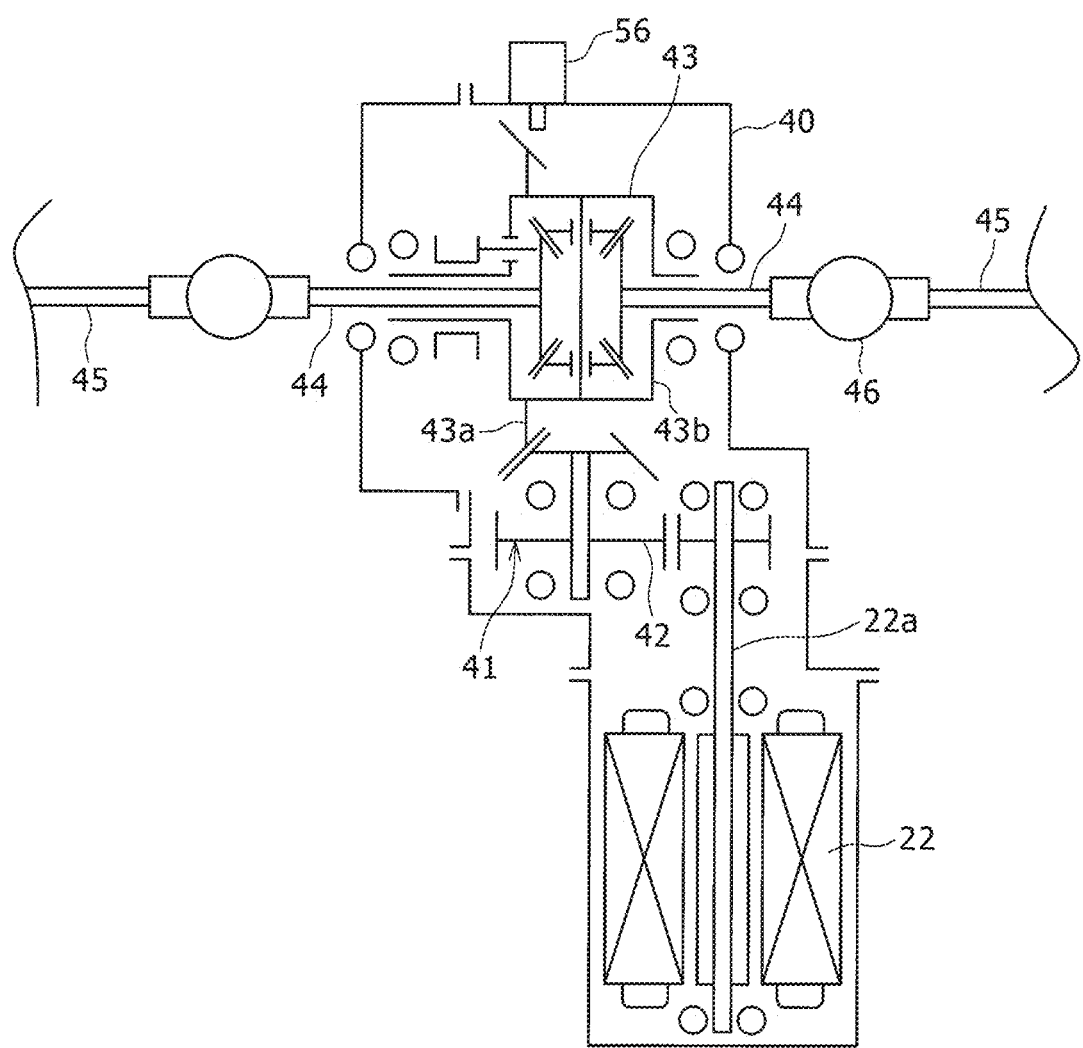
FIG. 4 is an enlarged view of a B part of FIG. 2.

FIG. 1 to FIG. 8A-FIG. 8C shows an embodiment of the present disclosure. FIG. 1 is a side view of a vehicle 10 on which a movable structure driving unit 20 of the present embodiment is mounted. FIG. 2 is a diagram showing an overall structure of the movable structure driving unit 20 mounted on the vehicle 10. FIG. 3 is an enlarged view of an A part of FIG. 2. FIG. 4 is an enlarged view of a B part of FIG. 2.

In the vehicle 10 shown in FIG. 1, a platform 12 which is a fundamental structure is fixed at an upper side of a frame 11 forming a vehicle body, and a front cover 13 is fixed to a front side (left side of FIG. 1) of the frame 11. In the platform 12, a driver seat 14 is fixed at a rear side of the front cover 13, and a carriage 19 is fixed at a rear side of the driver seat 14. The vehicle 10 comprises two front wheels 15 on the left and right and two rear wheels 16 on the left and right, which are wheels supported at a front side and a rear side of the frame 11, an operation element group 18, and the movable structure driving unit 20. As shown in FIG. 1, a battery 23 to be described later is placed at a space below the driver seat 14.

The movable structure driving unit 20 comprises an engine 21 and an electric motor 22 which are motive power sources, the battery 23 (FIG. 1 and FIG. 5) which is a power supply, a power generator GE (FIG. 2) driven by the engine 21 and for generating electricity to be stored in the battery 23, a rear-side motive power transmission unit 25 (FIG. 2) and a front-side motive power transmission unit 41 (FIG. 2), a sensor switch group 50, and a control device 70. The engine 21 corresponds to a rear-side motive power source. The sensor switch group 50 has a jump sensor 51 to be described later. The jump sensor 51 detects a jump of the front wheel 15 from the ground, as will be described later. The jump sensor 51 corresponds to a jump detector.

The control device 70 controls a motor driving circuit 24 (FIG. 2 and FIG. 5) to stop supply of a driving current from the battery 23 to the electric motor 22 when the jump of the front wheel 15 from the ground is detected in a state where four-wheel drive is instructed by an operation of a drive switching switch 52, as will be described later. With this process, the front-side motive power transmission unit 41 which is a driving mechanism of the front wheels 15 can be protected.

The operation element group 18 includes an acceleration pedal 60 which is an acceleration instructor and a brake pedal which is a brake instructor (not shown) which are provided at a front side of the driver seat 14, and a steering operator 61 which is a turn instructor and a forward/rearward movement lever 62 provided at the front side of the driver seat 14.

The steering operator 61 is formed from a steering wheel fixed on a steering shaft protruding at an upper side of the front covert 13 toward a slanted rear side. The steering operator 61 is connected to the two front wheels 15 at the left and right in a manner to allow steering of the front wheels 15 via a steering mechanism of an Ackermann type.

As shown in FIG. 2, the forward/rearward movement lever 62 is formed to have an operation position switchable among three positions including a forward movement position (F position), a neutral position (N position), and a rearward movement position (R position). The forward/rearward movement lever 62 is supported on the vehicle body in a manner to allow swinging movement in the front-and-rear direction (up-and-down direction of FIG. 2). The forward/rearward movement lever 62 may be formed as a transmission lever which can switch the forward traveling in a plurality of stages of traveling speed ranges such as low speed, high speed, etc.

The engine 21 is fixed to a lower side of the carriage 19 at a rear side of the driver seat 14 on the frame 11. The engine 21 is started by a startup switch (not shown) being operated to ON. As the engine 21, any of a plurality of types of engines may be used, including gasoline engines, diesel engines, and the like. The motive power of the engine 21 is transmitted to the two rear wheels 16 at the left and right via the rear-side motive power transmission unit 25, to drive the two rear wheels 16.

Figure 5:
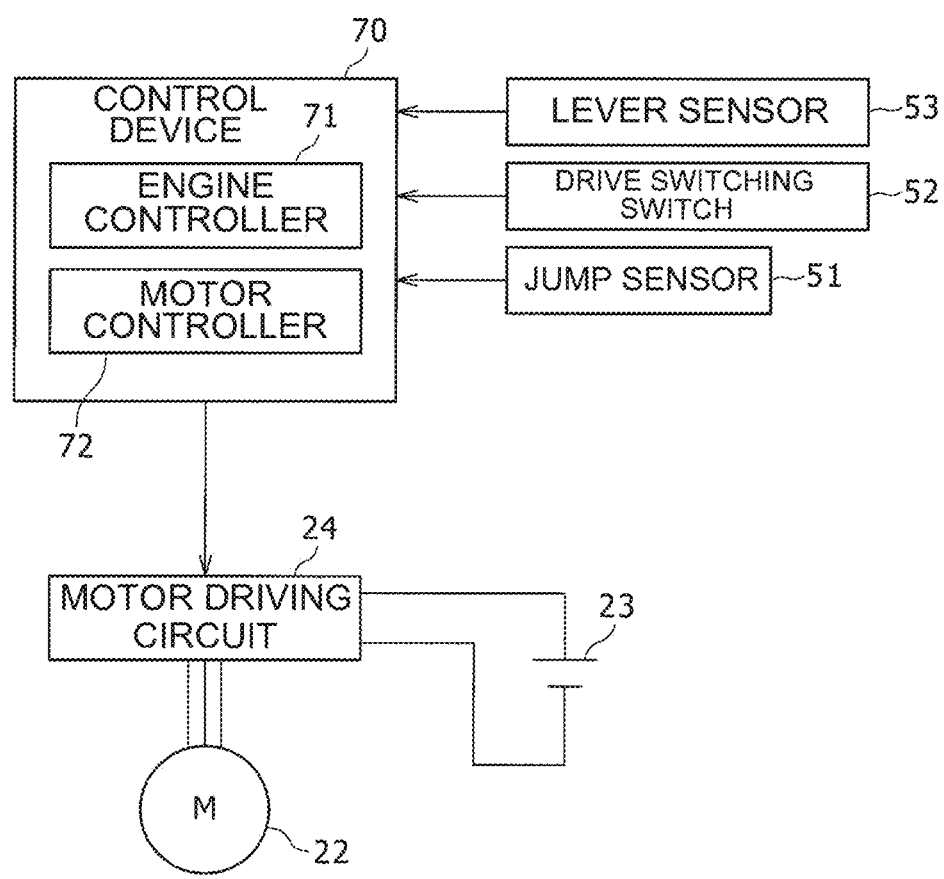
FIG. 5 is a diagram showing structures of a driving circuit of an electric motor and a control device in an embodiment of the present disclosure.

The electric motor 22 is placed inside a front-side case 40 (FIG. 2) to be described later, which is fixed at the front side of the driver seat 14 on the frame 11. The battery 23 (FIG. 5) is electrically connected to the electric motor 22 via the motor driving circuit 24 (FIG. 2 and FIG. 5). The battery 23 is placed inside the front cover 13, or at a lower side of the driver seat 14 or the carriage 19. As will be described later, the electric motor 22 is started when the startup switch (not shown) is operated to ON and four-wheel drive (4WD) is instructed which is an instruction of driving of the front wheels 15 and the rear wheels 16, by the drive switching switch 52 (FIG. 2 and FIG. 5) to be described later.

For the electric motor 22, various types of motors may be used such as a DC motor, a permanent magnet motor, and an induction motor. The motive power of the electric motor 22 is transmitted to the two front wheels 15 at the left and right via the front-side motive power transmission unit 41, to drive the two front wheels 15. With this process, the electric motor 22 drives the front wheels 15.

The rear-side motive power transmission unit 25 and the front-side motive power transmission unit 41 will now be described. As shown in FIG. 3, the rear-side motive power transmission unit 25 includes a CVT 26 which is a belt-type continuously variable transmission device, a gear transmission device 30, a differential device 36, an output shaft 37, and a rear axle 38. The rear-side motive power transmission unit 25 is connected between the engine 21 and the rear wheel 16 (FIG. 2) in a manner to allow transmission of motive power from the engine 21 to the rear wheel 16. For this purpose, the rear wheel 16 and the engine 21 are connected via the CVT 26.

The CVT 26 is formed by winding a belt 29 around an input pulley 27 and an output pulley 28. The input pulley 27 has a fixed sheave 27a fixed on an output shaft 21a of the engine 21, and a movable sheave 27b supported on the output shaft 21a in a manner to allow movement in an axial direction and opposing the fixed sheave 27a. The output pulley 28 has a fixed sheave 28a fixed on an input shaft 31 of the gear transmission device 30, and a movable sheave 28b supported on the input shaft 31 in a manner to allow movement in an axial direction and opposing the fixed sheave 28a. The movable sheave 27b of the input pulley 27 moves in the axial direction by an actuator 26a including an electric motor. The actuator 26a corresponds to an electric actuator. An elastic force is urged to the movable sheave 28b of the output pulley 28 by a spring (not shown) in a direction toward the fixed sheave 28a. As the rotational speed of the engine 21 is increased, the actuator 26a causes the movable sheave 27b of the input pulley 27 to be closer to the fixed sheave 27a. With this configuration, when the rotational speed of the engine 21 is low, as shown in FIG. 3, a width between the movable sheave 27b and the fixed sheave 27a (inter-sheave width) is increased. Because of this, the CVT 26 is continuously variably transmitted, and a ratio (N1/N2) between a rotational speed N1 of the input pulley 27 and a rotational speed N2 of the output pulley 28 which is a gear ratio of the CVT 26 is increased. On the contrary, when the rotational speed of the engine 21 is increased, the inter-sheave width of the input pulley 27 is reduced. Thus, the CVT 26 is continuously variably transmitted, and the gear ratio (N1/N2) of the CVT 26 is reduced. With this process, a torque of the input shaft 31 during low-speed travel can be increased, and fuel consumption during high-speed travel can be improved.

The gear transmission device 30 includes a rear-side case 35 fixed at a rear side of the engine 21 on the frame 11, and the input shaft 31, a transmission shaft 32, and a final shaft 33 placed in the rear-side case 35 in a rotatable manner. The gear transmission device 30 enables transmission of motive power from the input shaft 31 to the final shaft 33 via a gear mechanism 34a and a slide gear 34b provided around the transmission shaft 32. The slide gear 34b is connected to the forward/rearward movement lever 62. According to the operation of the forward/rearward movement lever 62, the slide gear 34b moves in the axial direction, and a gear to be engaged is switched, so that the relationship between a rotational direction of the input shaft 31 and a rotational direction of the final shaft 33 is switched. The motive power transmitted to the final shaft 33 is transmitted to a transmission gear 36a of the differential device 31 via a gear mechanism. Two output shafts 37 at the left and right are differentially connected to the differential device 36. The differential device 36 is placed inside the rear-side case 35. Each of the rear wheels 16 is connected to the output shaft 37 via a universal joint 39 and the rear axle 38. With this configuration, the rear wheel 16 is driven by the engine 21.

When a forward movement position is selected by the forward/rearward movement lever 62 (FIG. 2), forward movement of the vehicle 10 becomes possible. When the rearward movement position is selected by the forward/rearward movement lever 62, rearward movement of the vehicle 10 becomes possible. When the neutral position is selected by the forward/rearward movement lever 62, the inter-sheave width of the input pulley 27 is increased, such that the transmission of motive power is prevented between the output shaft 21a of the engine 21 and the belt 29 of the CVT 26.

As shown in FIG. 4, the front-side motive power transmission unit 41 includes a gear mechanism 42, a differential device 43, an output shaft 44, and a front axle 45. The front-side motive power transmission unit 41 is connected between the electric motor 22 and the front wheel 15 (FIG. 2) in a manner to allow transmission of the motive power from the electric motor 22 to the front wheel 15. A motive power of a rotation shaft 22a of the electric motor 22 is transmitted to a transmission gear 43a of the differential device 43 via the gear mechanism 42. Two output shafts 44 at the left and right are differentially connected to the differential device 43. Each of the front wheels 15 is connected to the output shaft 44 via a universal joint 46 and the front axle 45. The electric motor 22, the gear mechanism 42, and the differential device 43 are placed inside the front-side case 40. The front-side case 40 is fixed at a front side of the frame 11 (FIG. 1). With this configuration, the front wheel 15 is driven by the electric motor 22.

As shown in FIG. 2, the sensor switch group 50 includes a lever sensor 53 (FIG. 5), a pedal sensor 54, the drive switching switch 52, a rear axle speed sensor 55, a front axle speed sensor 56, an engine speed sensor 57, and the jump sensor 51.

The lever sensor 53 (FIG. 5) detects a position of the forward/rearward movement lever 62, and transmits a detection signal thereof to the control device 70 to be described later. When the control device 70 judges from the detection signal of the lever sensor 53 that the forward/rearward movement lever 62 is at the neutral position, the control device 70 applies a control to largely separate the movable sheave 27b of the input pulley 27 from the fixed sheave 27a so that the motive power of the input pulley 27 is not transmitted to the belt 29 by flexure of the belt 29. With this process, the neutral state is realized.

The pedal sensor 54 detects an amount of operation, which is an operation state, of the acceleration pedal 60, and transmits a detection signal thereof to the control device 70. The control device 70 has an engine controller 71 (FIG. 5). The engine controller 71 controls a throttle valve (not shown) of the engine 21 so that a degree of opening of the throttle valve is increased as the amount of operation of the acceleration pedal 60 is increased. In order to drive the throttle valve, a valve driving electric motor which is controlled by the engine controller 71 may be provided. The degree of opening of the throttle valve changes according to the driving of the valve driving electric motor. The rotational speed of the engine 21 is adjusted by the degree of opening of the throttle valve, and the rotational speed of the engine 21 is increased as the degree of opening of the throttle valve is increased. The concept of "rotational speed" includes a rotation number which is a rotational speed per unit time, for example, per minute.

Alternatively, a driving unit of the throttle valve may be connected to the acceleration pedal 60 via a link or a cable, and the degree of opening of the throttle valve may be increased as the amount of operation of the acceleration pedal 60 is increased. In this case, the pedal sensor may be provided near the throttle valve and indirectly detect the pedal position of the acceleration pedal 60 by detecting the degree of opening of the throttle valve, in place of directly detecting the pedal position of the acceleration pedal 60.

A brake pedal (not shown) is connected to a hydraulic pressure generation mechanism (not shown) via a link. On one or both of the pair of front wheels 15 and the pair of rear wheels 16, a brake disc (not shown) is fixed, and two brake pads (not shown) at an inner side and an outer side of the vehicle are placed on respective sides of the brake disc. The hydraulic pressure generation mechanism generates a braking force to sandwich the brake disc by applying a hydraulic pressure force to one of the two brake pads.

The drive switching switch 52 is provided to be operable by the user on a drive panel on which the forward/rearward movement lever 62 protrudes, and instructs a driving state of the vehicle by an operation. Specifically, with the operation on the drive switching switch 52, the instruction is switched between an instruction to set the vehicle in a two-wheel drive (2WD) state and an instruction to set the vehicle in a four-wheel drive (4WD) state. A signal indicating the instruction of the drive switching switch 52 is transmitted to the control device 70. The control device 70 switches the traveling state between the two-wheel drive and the four-wheel drive according to the switching of the drive switching switch 52. Specifically, the control device drives only the rear wheel 16 when the two-wheel drive is instructed, by driving the engine 21 and stopping the electric motor 22. When the four-wheel drive is instructed, the control device 70 drives both the engine 21 and the electric motor 22.

Further, the control device 70 has a motor controller 72 (FIG. 5). The motor controller 72 controls the electric motor 22 so that the rotational speed of the electric motor is increased as the amount of operation of the acceleration pedal 60 is increased in the state in which the four-wheel drive is instructed.

The rear axle speed sensor 55 detects a rotational speed of the transmission gear 36*a* (FIG. 3) of the differential device 36. The transmission gear 36*a* is fixed to a differential case 36*b* of the differential device 36. The differential case 36*b* rotates at an average rotational speed of the two rear axles 38 at the left and right. With this configuration, the rear axle speed sensor 55 can detect the average rotational speed of the two rear axles 38 at the left and right. A detection signal of the rear axle speed sensor 55 is input to the control device 70.

The front axle speed sensor 56 detects a rotational speed of the transmission gear 43*a* (FIG. 4) of the differential device 43. The transmission gear 43*a* is fixed on a differential case 43*b* of the differential device 43. The front axle speed sensor 56 corresponds to a first rotational speed detector. The transmission gear 43*a* corresponds to a motive power transmitting rotational structure. The differential case 43*b* rotates at an average rotational speed of the two front axles 45 at the left and right. With this configuration, the front axle speed sensor 56 can detect the average rotational speed of the two front axles 45 at the left and right. A detection signal of the front axle speed sensor 56 is input to the control device 70.

The engine speed sensor 57 detects the rotational speed of the output shaft 21*a* of the engine 21, and transmits a detection signal thereof to the control device 70. The control device 70 controls the actuator 26*a* to move the movable sheave 27*b* of the CVT 26 according to the detected value of the engine speed sensor 57.

In the above description, a case is described in which the CVT 26 is electrically driven and includes the electric motor. Alternatively, the CVT may be of a hydraulic pressure type in which the movable sheave is moved by a hydraulic pressure device, or of a mechanical type in which the movable sheave is moved by a pressurization force generation mechanism including a torque cam.

Figure 6:
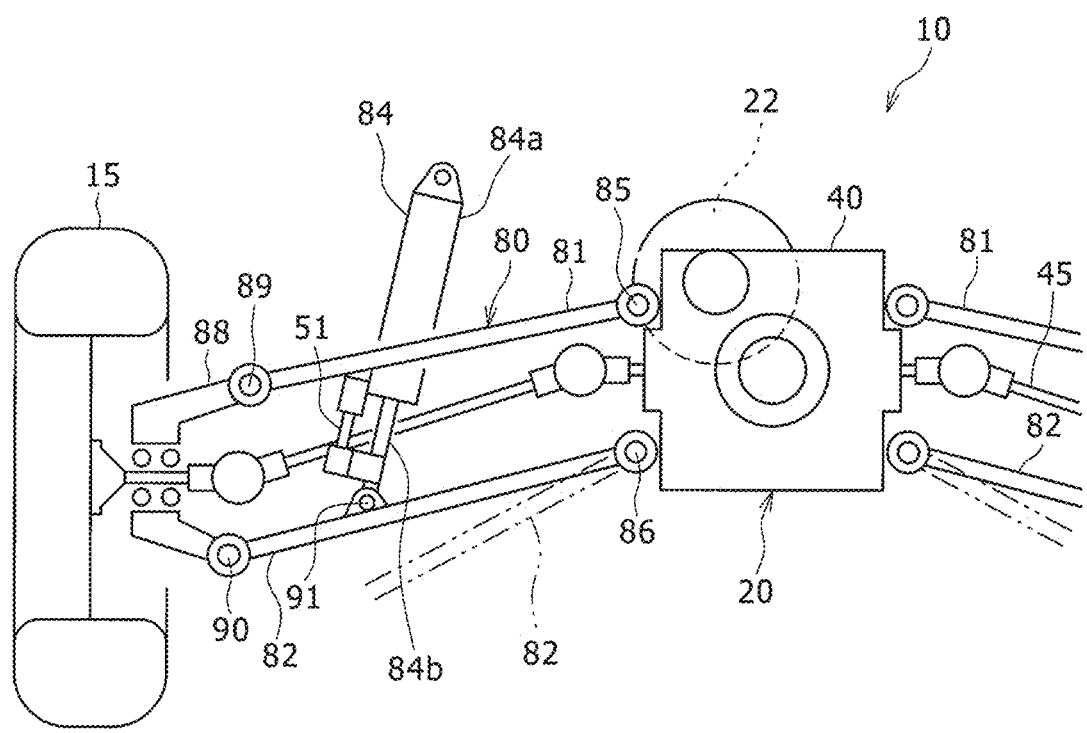
FIG. 6 is a diagram showing a suspension device and a jump detector for a right front wheel in an embodiment of the present disclosure, as viewed from a front side of the vehicle and with a portion omitted.

Further, the jump sensor 51 detects jump of the two front wheels 15 at the left and right from the ground; that is, running-off. FIG. 6 is a diagram showing a suspension device 80 and the jump sensor 51 for the right front wheel 15 in the present embodiment, as viewed from the front side of the vehicle and with a portion omitted.

The front wheel 15 is supported on the vehicle body via the suspension device 80. The suspension device 80 includes a plurality of arms 81 and 82, and a rod-cylinder unit 84 which extends and contracts. The plurality of arms 81 and 82 are placed in a separated manner at an upper side and lower side on each of left and right sides. Inner ends, in the width direction of the vehicle, of the arms 81 and 82 are respectively supported on the frame 11 (FIG. 1), in a rotatable manner about axes 85 and 86 along the front-and-rear direction. Outer ends, in the vehicle width direction, of the arms 81 and 82 are respectively supported on upper and lower ends of a wheel support unit 88 which rotatably supports the front wheel 15, in a rotatable manner about axes 89 and 90 along the front-and-rear direction.

The rod-cylinder unit 84 includes a cylinder case 84*a*, and a rod 84*b* which extends from a lower side of the cylinder case 84*a*. A lower end of the rod 84*b* is connected to the arm 82 at the lower side, in a rotatable manner about an axis 91 along the front-and-rear direction. An upper end of the cylinder case 84*a* is connected to a portion (not shown) of the frame 11 (FIG. 1), in a rotatable manner about an axis along the front-and-rear direction. An upper end of the rod 84*b* is connected to a piston (not shown) in the cylinder case 84*a*. Oil or air is sealed between the cylinder and the piston in the cylinder case 84*a*.

The jump sensor 51 is connected between the cylinder case 84*a* and the lower end of the rod 84*b*, and detects a change of a protrusion length of the rod 84*b* from the cylinder case 84*a*. The jump sensor 51 detects that the front wheel 15 has jumped from the ground when an amount of extension of the rod-cylinder unit 84 with respect to a reference length becomes greater than or equal to a predetermined value. The reference length is a length from the upper end to the lower end of the rod-cylinder unit 84 in a state where a driver rides the vehicle 10 and the vehicle 10 is stopped. When the rod-cylinder unit 84 extends in an amount greater than or equal to the predetermined value, it can be considered that the vehicle 10 is floating from the ground, and the lower arm 82 is significantly lowered to the downward direction, and thus, the jump can be detected. A detection signal of the jump sensor 51 is transmitted to the control device 70 (FIG. 2 and FIG. 5).

The control device 70 is also called an ECU (Electronic Control Unit), is formed from, for example, a microcomputer, and has a CPU which is a calculation processor, a storage unit including a memory such as a RAM and a ROM, and an input/output port. The CPU has a function to read and execute a control program which is stored in the storage unit in advance. In general, the functions of various means of the control device 70 are realized by executing a control program. The control device 70 has the above-described engine controller 71 (FIG. 5) and motor controller 72 (FIG. 5).

FIG. 5 is a diagram showing a structure of the motor driving circuit 24 of the electric motor 22 and the control device 70 in the present embodiment. The battery 23 is connected to the electric motor 22 via the motor driving circuit 24. The motor driving circuit 24 converts a current which is output from the battery 23 into a drive current of the electric motor 22. For example, the motor driving circuit 24 includes an inverter which converts a DC current which is output from the battery 23 into a three-phase AC current.

The motor controller 72 controls the motor driving circuit 24 in a state where the four-wheel drive is instructed, to control driving of the electric motor 22. The motor controller 72 applies a control such that the electric motor 22 is rotated in a direction corresponding to a forward movement when the motor controller 72 judges that the forward movement position is selected by the forward/rearward movement lever 62 (FIG. 2) based on the detection signal from the lever sensor 53 and that the acceleration pedal 60 (FIG. 2) is being operated based on the detection signal from the pedal sensor 54 (FIG. 2). In this process, the driving current is supplied from the battery 23 to the electric motor 22.

On the other hand, when the motor controller 72 judges that the rearward movement position is selected by the forward/rearward movement lever 62 and that the acceleration pedal 60 is being operated, the motor controller 72 applies a control to rotate the electric motor in a direction corresponding to the rearward movement. In this process also, the driving current is supplied from the battery 23 to the electric motor 22.

When the motor controller 72 judges that the neutral position is selected by the forward/rearward movement lever 62, the motor controller 72 stops the supply of current from the battery 23 to the electric motor 22.

When there is the instruction of the four-wheel drive, the motor controller 72 controls the electric motor 22 to match the rotational speed of the front wheel 15 to the rotational speed of the rear wheel 16, based on the detection signals of the rear axle speed sensor 55 and the front axle speed sensor 56 (FIG. 2).

The control device 70 controls the actuator 26a to change the inter-sheave width of the input pulley 27 of the CVT 26 according to the rotational speed of the engine 21. Further, when the rotational speed of the engine 21 is lower than a predetermined value, the control device 70 increases the inter-sheave width of the input pulley 27, to cause the belt 29 to flex and prevent generation of a tensioning force on the belt 29, so that the motive power of the input pulley 27 is not transmitted to the belt 29 of the CVT 26.

In place of the control device 70 increasing the inter-sheave width to prevent the generation of the tensioning force on the belt 29 when the rotational speed of the engine 21 is lower than the predetermined value, a centrifugal clutch may be provided between the output shaft 21a of the engine 21 and the input pulley 27. In this case, the output shaft 21a and the input pulley 27 are disconnected when the rotational speed of the engine 21 is lower than a predetermined value, and the output shaft 21a and the input pulley 27 are connected via the centrifugal clutch when the rotational speed of the engine 21 is greater than or equal to the predetermined value.

Further, when the jump of the front wheel(s) 15 from the ground is detected in a state in which the four-wheel drive is instructed by the operation of the drive switching switch 52, the motor controller 72 controls the motor driving circuit 24 to stop the supply of the driving current from the battery 23 (FIG. 5) to the electric motor 22. Alternatively, the motor driving circuit 24 may have a relay switch which is controlled by the motor controller 72.

Further, the motor controller 72 controls the motor driving circuit 24 so that, after a predetermined time has elapsed without detection of a jump of the front wheel(s) 15 after the jump of the front wheel(s) 15 from the ground is detected and the supply of the driving current is stopped, the supply of the driving current from the battery 23 to the electric motor 22 is re-started.

Figure 7:
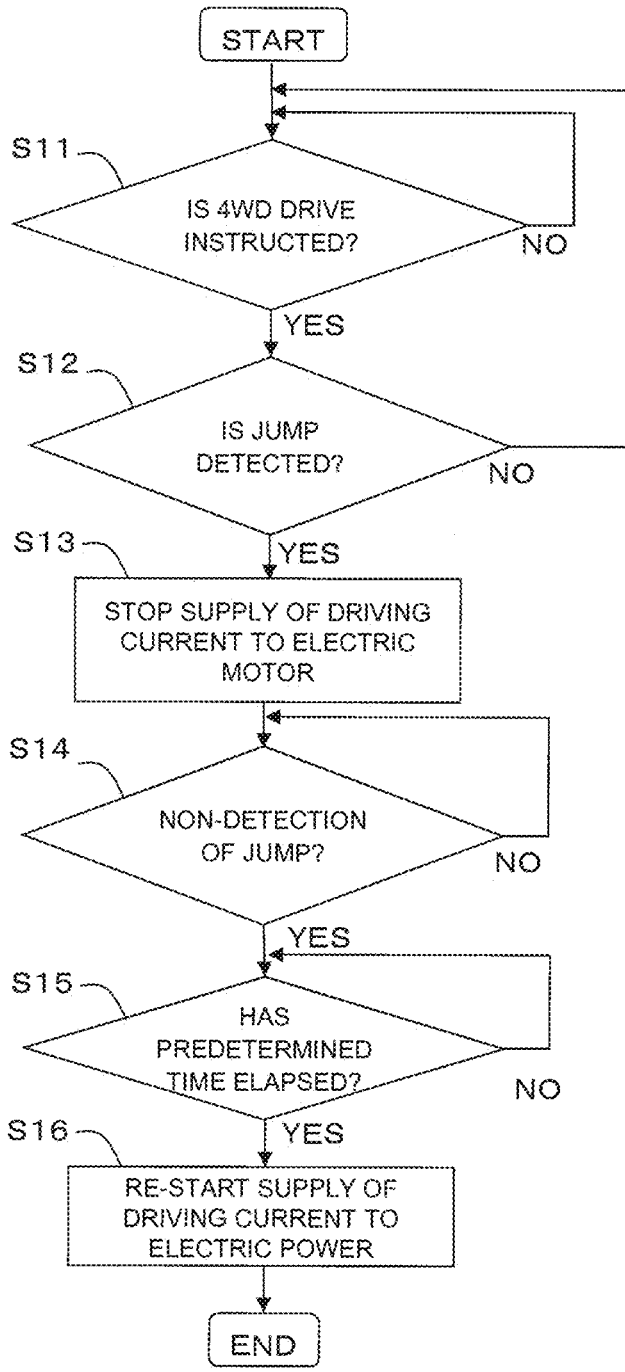
FIG. 7 is a flowchart showing a control method at a time of jump detection in an embodiment of the present disclosure.

FIG. 7 is a flowchart showing an example of a control process of the movable structure driving unit 20 having the above-described structure, and showing a control method during detection of jump. In the following, reference numerals of FIG. 1~FIG. 6 will be used as suited. Processes of steps S11~S16 are executed by the motor controller 72. In step S11, it is judged whether or not there is an instruction of the four-wheel drive. When it is judged that there is the instruction of the four-wheel drive (YES in S11), it is then judged in step S12 whether or not jump is detected. When it is judged that jump is detected (YES in S12), in step S13, the supply of the driving current from the battery 23 to the electric motor 22 is stopped. With this process, the front wheel 15 is not driven by the electric motor 22, and is set in a state of running on idle by inertia. Because of this, when the vehicle 10 lands on the ground after the jump as shown in (c) of FIG. 8A to FIG. 8C to be described later, because the front wheel 15 is not driven by the electric motor 22, the front wheel 15 does not receive an excessively high force from the ground. Therefore, the front-side motive power transmission unit 41 which is the driving mechanism of the front wheel 15 can be protected regardless of the jump during the travel. Further, because it is not necessary to excessively increase the strength of the front-side motive power transmission unit 41, the increases in the size and the cost of the front-side motive power transmission unit 41 can be suppressed.

When the judgment of steps S11 or S12 of FIG. 7 is negative (NO in S11 or S12), the process returns to a state before step S11. After the step S13, in step S14, it is judged whether or not non-detection of the jump is realized. When it is judged that the non-detection of the jump is realized (YES in S14), the method proceeds to step S15. When the judgment of step S14 is negative (NO in S14), the process of step S14 is repeated. In step S15, it is judged whether or not a predetermined time has elapsed from the time when the non-detection of the jump is realized. When it is judged that the predetermined time has elapsed (YES in S15), the method proceeds to step S16. When the judgment of step S15 is negative (NO in S15), the process of step S15 is repeated. In step S16, the supply of the driving current from the battery 23 to the electric motor 22 is re-started. With this process, the application of high power to the front-side motive power transmission unit 41 can be further suppressed, and, consequently, the front-side motive power transmission unit 41 can be further protected.

Alternatively, in the structure of FIG. 1~FIG. 7, the jump detector may comprise a stroke sensor which detects an amount of extension of the rod-cylinder unit 84 (FIG. 6) with respect to a reference length, and a jump judgment unit provided on the control device 70. A detection signal indicating a detected value of the stroke sensor is transmitted to the control device 70. The jump judgment unit detects the jump by judging that the front wheel 15 has jumped when the amount of extension of the rod-cylinder unit 84 with respect to the reference length becomes a predetermined value or greater, based on the detection signal of the stroke sensor.

Figures 8A, 8B, 8C:
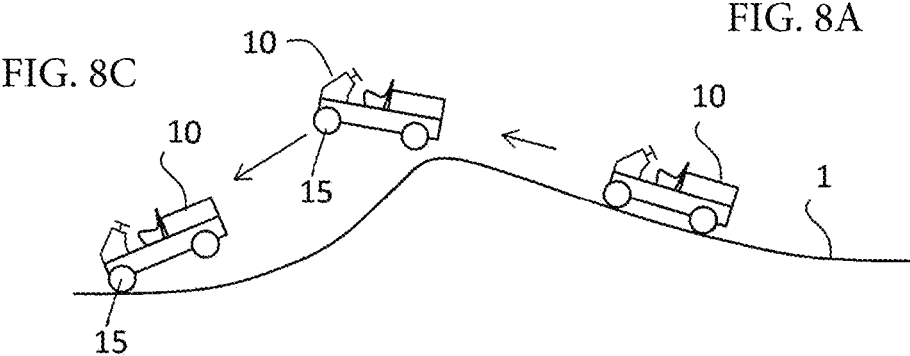
FIG. 8A-FIG. 8C is a diagram showing a jump state of a vehicle and states before and after the jump state in an embodiment of the present disclosure.

FIG. 8A-FIG. 8C is a diagram showing a jump state and states before and after the jump of the vehicle 10 in the present embodiment. As shown in the order of FIG. 8A, FIG. 8C and FIG. 8C in FIG. 8, during travel on wasteland, when the vehicle 10 travels over a small mountain at a relatively high vehicle velocity, the front wheels 15 jump away from the ground 1, and then the vehicle 10 lands on the ground from the front wheels 15. When the front wheels 15 and the rear wheels 16 are separated from the ground 1, the force from the ground 1 and received by the front wheels 15 and the rear wheels 16 vanishes. Because of this, it becomes easier for the acceleration pedal to be stepped on in a large amount. In this process, if the supply of the driving current from the battery 23 to the electric motor 22 is continued, the speed of the front wheels 15 tends to be easily rapidly increased. After the landing of the vehicle 10, the front wheels 15 are rapidly decelerated by the ground 1, causing an excessive impact on the front-side motive power transmission unit 41. This excessive impact may be a cause of insufficiency of the strength of the front-side motive power transmission unit 41 or reduction of endurance of the front-side motive power transmission unit 41. According to the embodiment described above, when the jump of the front wheels 15 is detected, the supply of the driving current from the battery 23 to the electric motor 22 is stopped, so that the front-side motive power transmission unit 41 can be protected.

On the other hand, when the vehicle lands on the ground after the jump, because the rear wheels 16 are driven by the engine 21 and are rotating, a large impact may be applied also to the rear-side motive power transmission unit 25 which is the driving mechanism of the rear wheel 16. However, because the rear wheel 16 is driven in both the two-wheel drive and the four-wheel drive during the normal time, normally, the rear-side motive power transmission unit 25 is designed with high strength. Thus, problems tend to not be caused in the practical use by application of the impact of the landing to the rear-side motive power transmission unit 25.

Figure 9:
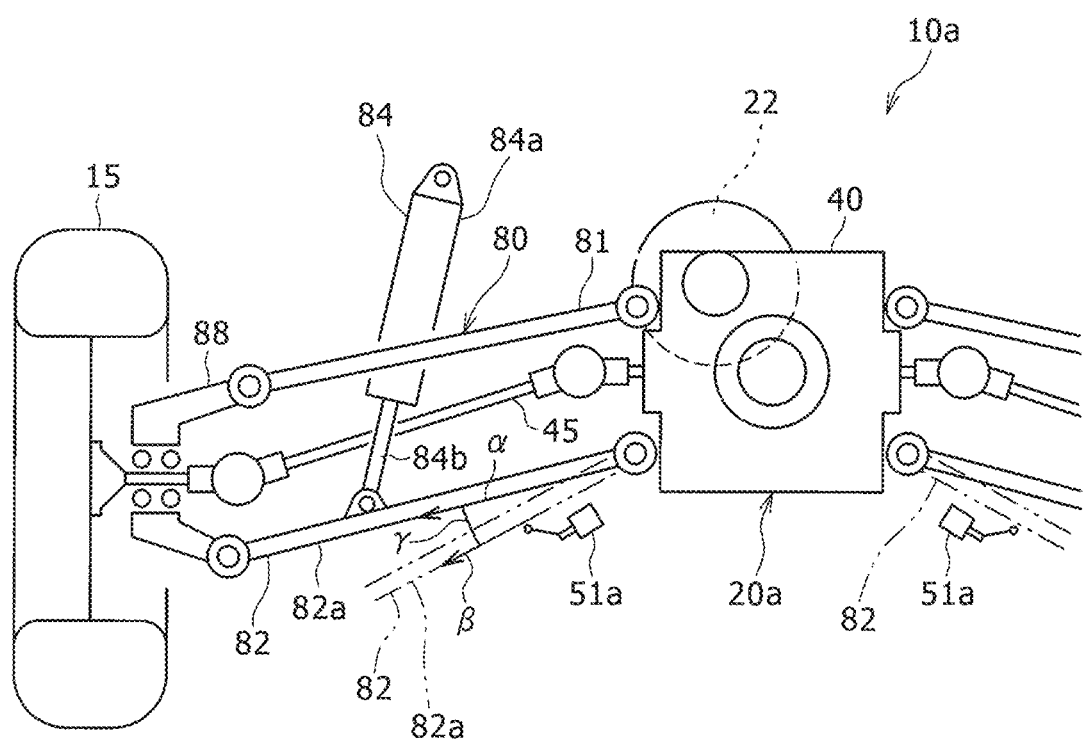
FIG. 9 is a diagram showing an alternative configuration of an embodiment of the present disclosure, and corresponding to FIG. 6.

FIG. 9 shows an alternative configuration of the present embodiment, and is a diagram corresponding to FIG. 6. In a vehicle 10a including a movable structure driving unit 20a of the present configuration, two jump sensors 51a at the left and right are fixed on the frame 11 (refer to FIG. 1), opposing a lower surface 82a, which is a surface to be detected, of the arm 82 at the lower side. With the movement of the vehicle body in the up-and-down direction, a direction of the lower surface 82a of the arm 82 changes with respect to a reference direction (a direction of an arrow α in FIG. 6) of the lower surface 82a of the arm 82. The jump sensor 51a detects, when the arm 82 is lowered toward the front wheel 15 as shown by a two-dots-and-a-chain line of FIG. 9, an angle γ between the reference direction and an actual direction (a direction of an arrow β of FIG. 6) of the lower surface 82a of the arm 82. The jump sensor 51a detects a jump when the detected value of the angle γ described above is greater than or equal to a predetermined value. A detection signal of the jump sensor 51a is transmitted to the control device 70 (FIG. 5). The other structures and operations in the present configuration are similar to those of the structure of FIG. 1~FIG. 7.

Alternatively, in the structure of FIG. 1~FIG. 7 or in the structure of FIG. 9, in place of the jump sensors 51 and 51a, an upper weight sensor corresponding to a detector may be used. The upper weight sensor is connected, for example, between the cylinder case 84a and the lower end of the rod 84b similar to the jump sensor 51 of the structure of FIG. 1~FIG. 7, and detects the change of the protrusion length of the rod 84b from the cylinder case 84a. Further, unlike the jump sensor 51, the upper weight sensor does not detect the jump directly, but detects a change of a weight of a part of the vehicle acting on the suspension device 80 (FIG. 6); that is, a weight of the portion including portions above the suspension device 80, by detecting the change of the protrusion length as described above. When the protrusion length is increased, it is detected that a reduction amount of the weight is increased. When the reduction amount of the weight detected by the upper weight sensor is greater than or equal to a predetermined value in a state in which the four-wheel drive is instructed, the motor controller controls the motor driving circuit 24, to stop the supply of the driving current from the battery 23 (FIG. 5) to the electric motor 22. With the reduction amount of the weight becoming greater than or equal to the predetermined value, the jump of the vehicle can be detected indirectly. With this structure, similar to the structure of FIG. 1~FIG. 7, the increases in the size and in the cost of the front-side motive power transmission unit 41 which drives the front wheel 15 can be suppressed, and the front-side motive power transmission unit 41 can be protected regardless of the jump during the travel.

Alternatively, similar to the jump sensor 51a of the structure of FIG. 9, the upper weight sensor may be fixed on the frame 11 (refer to FIG. 1), opposing the lower surface 82a, which is the surface to be detected, of the arm 82 at the lower side. Similar to the jump sensor 51a, the upper weight sensor detects the angle γ between the reference direction of the lower surface 82a of the arm 82 and the actual direction of the lower surface 82a, and detects the change of the weight of the part of the vehicle acting on the suspension device 80, through the detection of the angle γ. With the increase in the angle γ, an increase in the reduction amount of the weight is detected. Similar to the above, when the reduction amount of the weight detected by the upper weight sensor is greater than or equal to a predetermined value in a state in which the four-wheel drive is instructed, the motor controller controls the motor driving circuit 24, to stop supply of the driving current from the battery 23 (FIG. 5) to the electric motor 22. With this configuration also, the increases in the size and cost of the front-side motive power transmission unit 41 which drives the front wheel 15 can be suppressed, and the front-side motive power transmission unit 41 can be protected regardless of the jump during the travel.

Further, a structure may be employed in which the motor controller controls the motor driving circuit 24 so that, after a predetermined time has elapsed after the reduction amount of the weight detected by the upper weight sensor becomes lower than the predetermined value after the reduction amount of the weight detected by the upper weight sensor becomes greater than or equal to the predetermined value and the supply of the driving current is stopped, the supply of the driving current from the battery 23 to the electric motor 22 is re-started.

Figure 10:
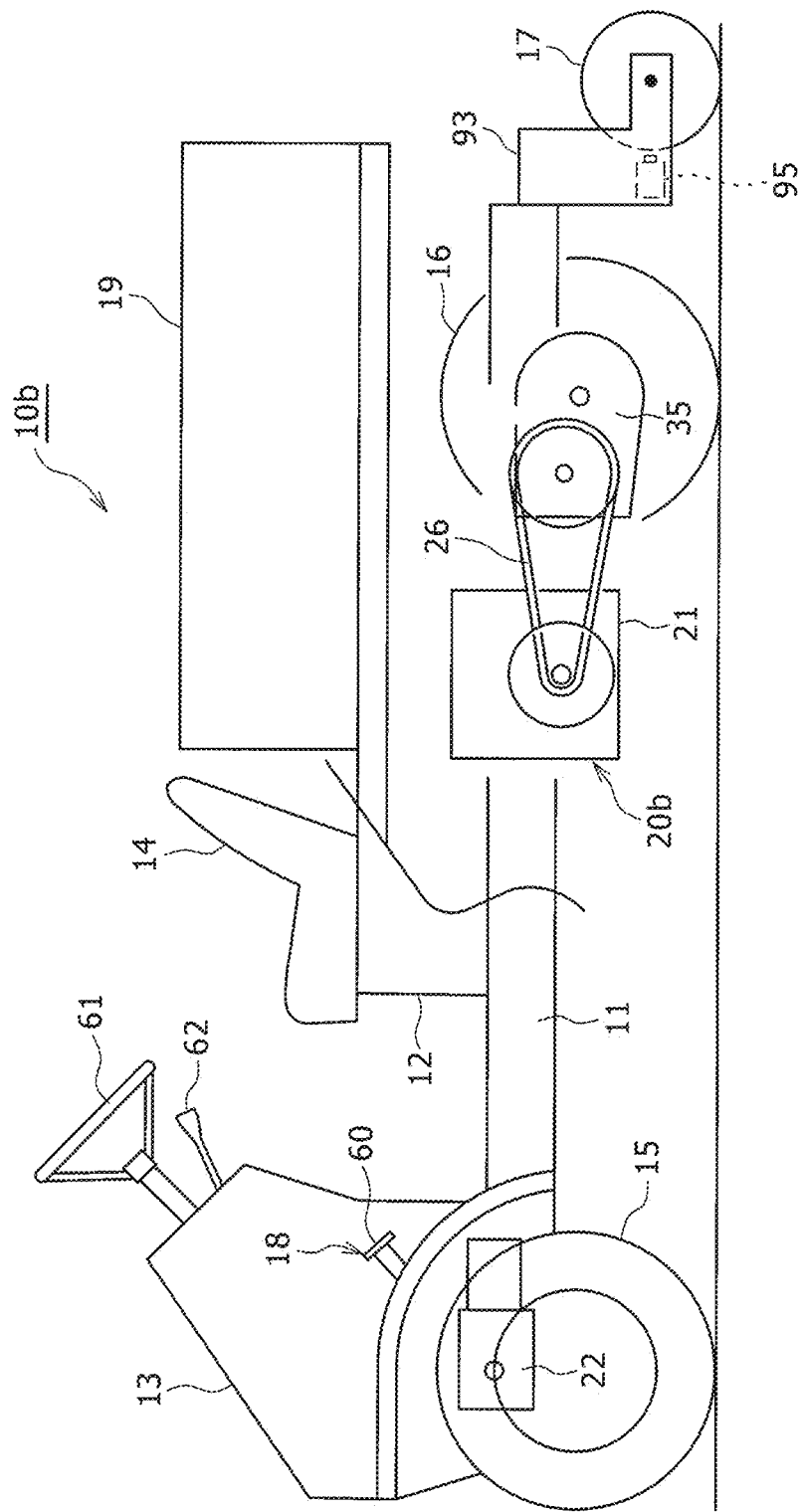
FIG. 10 is a diagram showing an alternative configuration of an embodiment of the present disclosure, and corresponding to FIG. 1.
Figure 11:
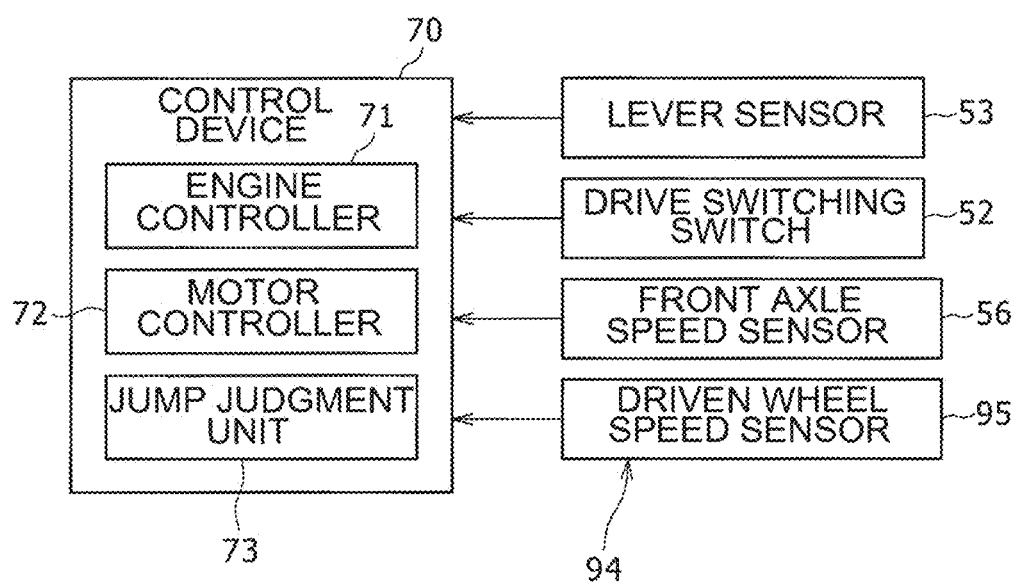
FIG. 11 is a block diagram showing an input for a control device and a structure of the control device in an alternative configuration of an embodiment of the present disclosure.

FIG. 10 is a diagram showing an alternative configuration of an embodiment of the present disclosure, and corresponding to FIG. 1. FIG. 11 is a block diagram showing an input for the control device 70 and a structure of the control device 70 in the alternative configuration of the embodiment of the present disclosure. In a vehicle 10b including a movable structure driving unit 20b of the present configuration, a wheel support member 93 is fixed on a rear end of the frame 11 and extending in a lower side. A driven wheel 17 which is a driven rotation wheel is supported at a rear end of the wheel support member 93, in a rotatable manner about an axis along a left-and-right direction (width direction) (directions into and out of the page of FIG. 10) of the vehicle 10b. The driven wheel 17 rotates by a force received from the ground during the travel of the vehicle 10b.

As shown in FIG. 11, a jump detector 94 is formed including a driven wheel speed sensor 95 which detects a rotational speed of the driven wheel 17 (FIG. 10), and a jump judgment unit 73 provided on the control device 70. The driven wheel speed sensor 95 corresponds to a second rotational speed detector. The driven wheel speed sensor 95 transmits a detection signal to the control device 70.

The jump judgment unit 73 judges that jump is detected when a vehicle speed V2 calculated from the rotational speed of the transmission gear 43a (FIG. 4) of the front-side motive power transmission unit 41 (FIG. 4) is greater than a vehicle speed V1 calculated from the rotational speed of the driven wheel 17 by a predetermined value or by a predetermined ratio, and judges non-detection of the jump in other cases. The vehicle speed V1 calculated from the rotational speed of the driven wheel 17 is 0 or is significantly reduced upon jump of the vehicle 10b. On the other hand, the vehicle speed V2 calculated from the rotational speed of the transmission gear 43a is high when the electric motor 22 is driven, even during the jump of the vehicle 10b. Thus, the jump can be detected by an increase in the difference between two vehicle speeds V1 and V2 calculated based on the driven wheel 17 and the transmission gear 43a. The other structures and operations in the present configuration are similar to those of the structure of FIG. 1~FIG. 7.

Figure 12:
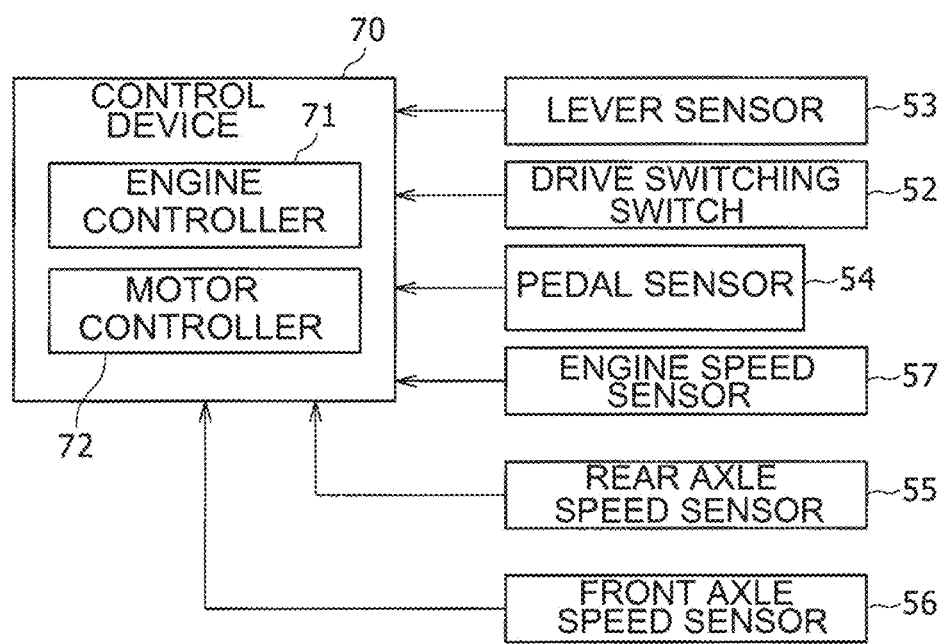
FIG. 12 is a block diagram showing an input for a control device and a structure of the control device in an alternative configuration of an embodiment of the present disclosure.
Figure 13:
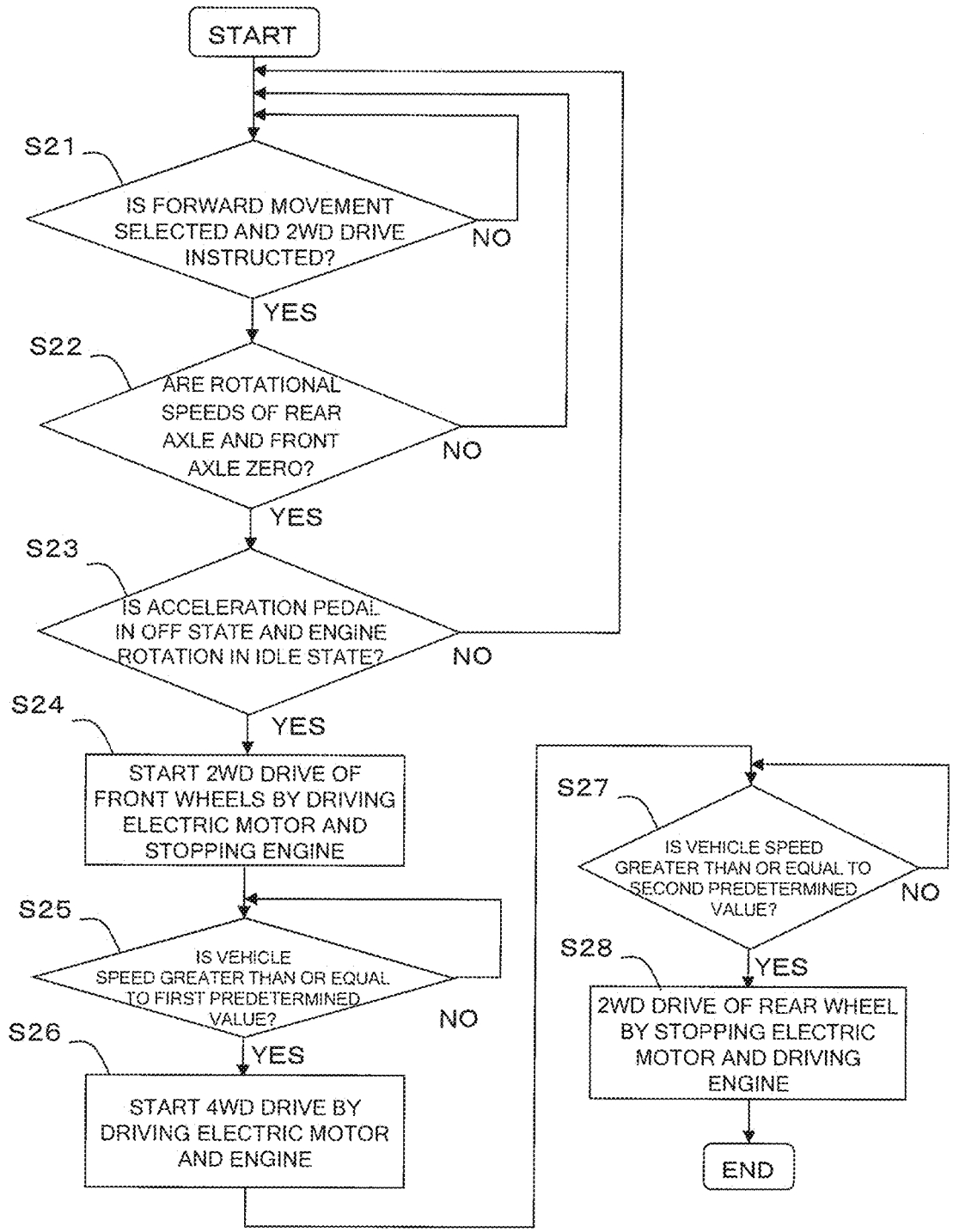
FIG. 13 is a flowchart showing a control method during start of travel in an alternative configuration of an embodiment of the present disclosure.

FIG. 12 is a block diagram showing an input for the control device 70 and a structure of the control device 70 in an alternative configuration of an embodiment of the present disclosure. FIG. 13 is a flowchart showing a control method during start of travel in the alternative configuration of the embodiment of the present disclosure. FIG. 14 is a diagram showing drive states of the front wheel 15 (FIG. 1) and the rear wheel 16 (FIG. 1) during start of travel, a low-speed travel, and a high-speed travel of the vehicle.

A movable structure driving unit of the present configuration is a structure that smoothens the start of the travel of the vehicle in the structure of FIG. 1~FIG. 7. In the structure of FIG. 1~FIG. 7, when the vehicle is stopped, the fixed sheave 27a and the movable sheave 27b in the input pulley 27 of the CVT 26 are significantly separated from each other. With this structure, no tensioning force is generated in the belt 29 between the input pulley 27 and the output pulley 28, and the motive power transmission between the engine 21 and the input shaft 31 of the gear transmission device 30 is suspended. In this case, even if the vehicle attempts to start traveling in a state where the two-wheel drive in which the vehicle travels only with the driving of the rear wheel 16 is instructed, the tensioning force is not generated in the belt 29 until the rotational speed of the engine 21 is increased to a predetermined value or greater. Thus, there is a room for improvement in the travel starting capability. In particular, when the user moves his/her feet off both of the acceleration pedal 60 and the brake pedal (when the pedals are switched OFF) in order to start traveling the vehicle at a very low speed, the vehicle attempts to creep-travel in a state where the engine 21 is rotated at an idling rotation number. However, because the tensioning force generated in the belt 29 is low, slipping tends to occur between the input pulley 27 and the output pulley 28 and the belt 29, and motive power tends to be not transmitted from the input pulley 27 to the belt 29. Because of this, the travel starting capability of the vehicle is low, and, for example, when the motive power is transmitted from the input pulley 27 to the belt 29, the connection of the motive power transmission rapidly changes from a disconnected state to a connected state, and the shock caused thereby is significant. In addition, because slipping tends to occur in the belt 29 during the start of travel, the belt 29 tends to be easily worn. The structure shown in FIG. 12 FIG. 14 resolves such a disadvantage.

As shown in FIG. 12, in the movable structure driving unit of the present configuration, detection signals of the lever sensor 53, the drive switching switch 52, the pedal sensor 54, the engine speed sensor 57, the rear axle speed sensor 55, and the front axle speed sensor 56 are transmitted to the control device 70. Based on the received detection signals of the sensors 53, 54, 57, 55, and 56 and the switch 52, the control device 70 starts the two-wheel drive of the front wheel 15. Specifically, when the control device 70 judges that the forward movement is selected by the forward/rearward movement lever 62 (refer to FIG. 2), that the two-wheel drive (2WD) of the rear wheel 16 is instructed by the drive switching switch 52, that an average rotational speed of the left and right rear axles 38 and an average rotational speed of the left and right front axles 45 are both zero, that the acceleration pedal 60 is in the OFF state, and that the engine 21 is being idle-rotated, the control device 70 drives the electric motor 22 to start the two-wheel drive of the front wheels 15. In this process, the control device 70 stops the engine 21 to stop the driving of the rear wheels 16. With this configuration, the start of travel of the vehicle can be smoothened and the wear of the belt 29 can be suppressed, as will be described later.

Further, the control device 70 activates the engine 21 to drive the front wheels 15 and the rear wheels 16 and to consequently realize the four-wheel drive (4WD) when the vehicle speed becomes greater than or equal to a first predetermined value. Moreover, the control device 70 stops the electric motor 22 and drives the engine 21 to realize the two-wheel drive of the rear wheel 16 when the vehicle speed becomes greater than or equal to a second predetermined value higher than the first predetermined value.

The control method during start of travel will now be described with reference to FIG. 13. In the following, reference numerals of FIG. 2 and FIG. 12 will be used as suited. The control process of FIG. 13 is executed by the control device 70. In step S21, it is judged whether or not the forward movement is selected by the forward/rearward movement lever 62 and the two-wheel drive (2WD) of the rear wheel 16 is instructed by the drive switching switch 52. When the judgment of step S21 is positive (YES in S21), the method proceeds to step S22. In step S22, it is judged, based on the detection signals of the rear axle speed sensor 55 and the front axle speed sensor 56, whether or not the average rotational speeds of the left and right rear axles 38 and the left and right front axles 45 are zero. When judgment of step S22 is positive (YES in S22), the method proceeds to step S23.

In step S23, it is judged, based on the detection signals of the pedal sensor 54 and the engine speed sensor 57, whether or not the acceleration pedal 60 is in the OFF state and the engine 21 is being idle-rotated at the idling rotation number. When judgment of S23 is positive (YES in S23), the method proceeds to step S24. If any of the judgments of steps S21, S22, and S23 is negative (NO in any of S21, S22, and S23), the process returns to a state before step S21, and the processes are repeated.

In step S24, the electric motor and the engine 21 are controlled such that the electric motor 22 is driven but the engine 21 is stopped. With this process, the two-wheel drive of the front wheel 15 is started.

Next, in step S25, it is judged whether or not the vehicle speed calculated based on the detection signal(s) of one or both of the rear axle speed sensor 55 and the front axle speed sensor 56 is greater than or equal to a first predetermined value. When it is judged that the vehicle speed is greater than or equal to the first predetermined value (YES in S25), the method proceeds to step S26. When the judgment of step S25 is negative (NO in S25), the process of step S25 is repeated.

In step S26, the electric motor 22 and the engine 21 are controlled so that both of the electric motor 22 and the engine 21 are driven. With this process, the four-wheel drive is started.

In step S27, it is judged whether or not the vehicle speed calculated based on the detection signal(s) of one or both of the rear axle speed sensor 55 and the front axle speed sensor 56 is greater than or equal to a second predetermined value. When it is judged that the vehicle speed is greater than or equal to the second predetermined value (YES in S27), the method proceeds to step S28. When the judgment of step S27 is negative (NO in S27), the process of step S27 is repeated.

In step S28, the electric motor 22 and the engine 21 are controlled so that the electric motor 22 is stopped and the engine 21 is driven. With this process, the two-wheel drive of the rear wheel 16 is started, and the process is completed.

FIG. 14 shows driving of each of the front wheels 15 and the rear wheels 16 with a circle (o) and stopping of the driving with an x (X). As shown in FIG. 14, during the start of travel, the front wheels 15 are driven and driving of the rear wheels 16 is stopped. In a low-speed travel in which the vehicle speed is greater than or equal to the first predetermined value, both of the front wheels 15 and the rear wheels 16 are driven. In a high-speed travel in which the vehicle speed is greater than or equal to the second predetermined value, the rear wheels 16 are driven and driving of the front wheels 15 is stopped.

According to the structure of the present configuration shown in FIG. 12 FIG. 14, the two-wheel drive of the front wheels 15 by the electric motor 22 is realized when the forward movement is selected by the forward/rearward movement lever 62, the two-wheel drive of the rear wheels 16 is instructed by the drive switching switch 52, the average rotational speeds of the left and right rear axles 38 and the left and right front axles 45 are zero, the acceleration pedal 60 is in the OFF state, and the engine 21 is being idle-rotated. With this configuration, it is not necessary to drive, during the start of travel of the vehicle, the rear wheels 16 by the engine 21 via the CVT 26, and thus, the vehicle is not stopped until the rotation number of the engine 21 is increased to a degree in which the tensioning force is generated in the belt 29. Because of this, the start of the travel of the vehicle, in particular, the start of travel at a very low speed, can be smoothened. After the vehicle starts to travel, the engine 21 is driven when the vehicle speed becomes greater than or equal to the first predetermined value. In this process, with the increase of the rotational speed of the engine 21, the motive power of the input pulley 27 (FIG. 3) of the CVT 26 is transmitted to the belt 29, and, in this process, a shock is generated due to the switching of the transmission of the motive power. On the other hand, in the travel at the vehicle speed of greater than or equal to the first predetermined value, an amount of operation of the acceleration pedal 60 is large, and thus, the feeling of deceleration due to the shock is small in comparison to the feeling of deceleration of the vehicle due to a change of the amount of operation of the acceleration pedal 60, and, consequently, uncomfortable feeling by the driver due to the shock tends not to be generated. Further, according to the structure of the present configuration, because slipping of the belt 29 tends to be not generated during the start of travel, the wear of the belt 29 can be suppressed. The other structures and operations in the present configuration are similar to those of the structure of FIG. 1~FIG. 7.

Figure 15:
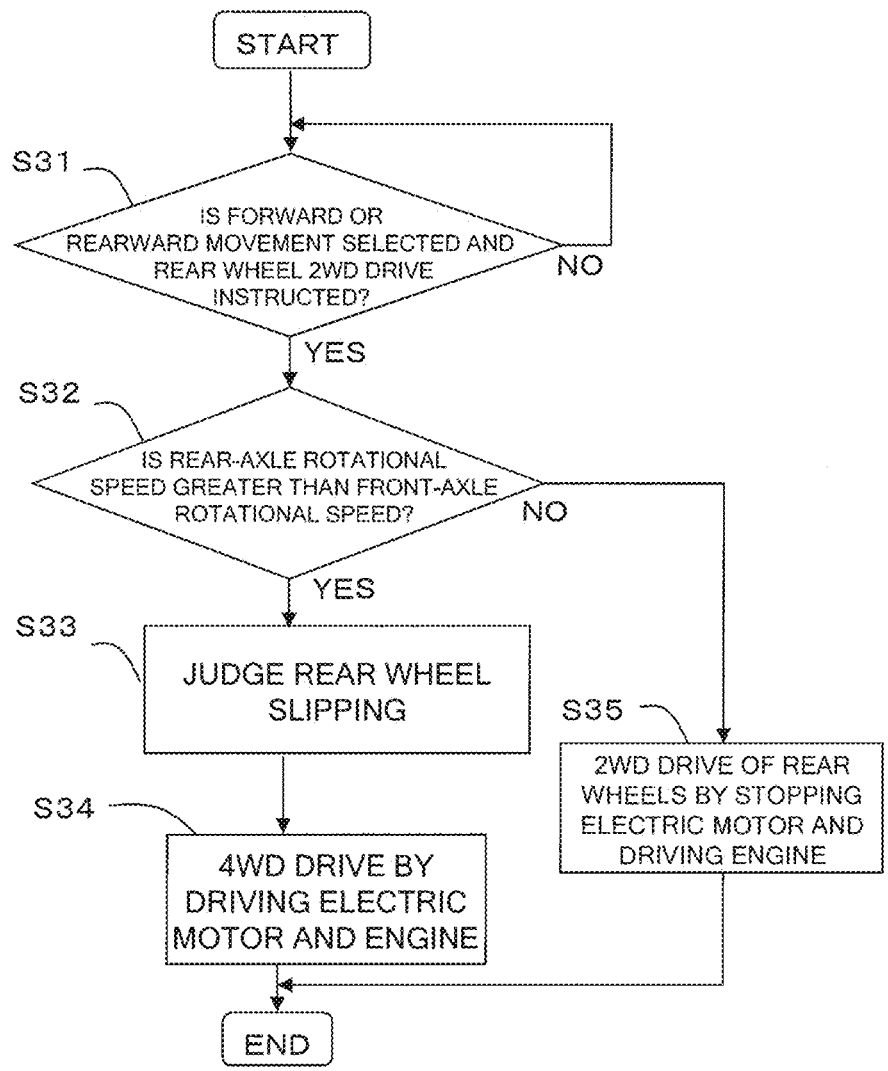
FIG. 15 is a flowchart showing a control method during slipping of a rear wheel in an alternative configuration of an embodiment of the present disclosure.

FIG. 15 is a flowchart showing a control method during rear wheel slipping, in an alternative configuration of an embodiment of the present disclosure. A movable structure driving unit of the present configuration is a structure for improving a rough-road traveling capability in the structure of FIG. 1~FIG. 7. In the structure of FIG. 1~FIG. 7, there may be cases where the traveling capability is degraded due to slipping of the rear wheels 16 when the vehicle travels on a rough road such as a damp ground by two-wheel drive of the rear wheels 16. The structure of the present configuration to be described with reference to FIG. 15 resolves such a disadvantage.

As shown in FIG. 12, in the movable structure driving unit of the present configuration, the detection signals of the lever sensor 53, the drive switching switch 52, the rear axle speed sensor 55, and the front axle speed sensor 56 are transmitted to the control device 70. The control device 70 starts the four-wheel drive according to the received detection signals of the sensors 53, 55, and 56, and the switch 52. Specifically, the control device 70 judges that the rear wheels 16 are slipping when the forward movement or the rearward movement is selected by the forward/rearward movement lever 62 (FIG. 2), the two-wheel drive (2WD) of the rear wheel 16 is instructed by the drive switching switch 52, and the average rotational speed of the left and right rear axles 38 (FIG. 2) is greater than the average rotational speed of the left and right front axles 45 (FIG. 2). When the control device 70 judges the slipping of the rear wheels 16, the control device 70 drives the electric motor 22 (FIG. 2), to start driving the front wheels 15. With this process, the four-wheel drive (4WD) is realized, and the rough-road traveling capability of the vehicle can be improved.

A control method during slipping of the rear wheel will now be described with reference to FIG. 15. In the following, the reference numerals of FIG. 2 and FIG. 12 will be used as suited. The control process of FIG. 15 is executed by the control device 70. In step S31, it is judged whether or not the forward movement or the rearward movement is selected by the forward/rearward movement lever 62, and the two-wheel drive (2WD) of the rear wheel 16 is instructed by the drive switching switch 52. When judgment of step S31 is positive (YES in S31), the method proceeds to step S32. When the judgment of step S31 is negative (NO in S31), the process returns to a state before step S31, and the process is repeated.

In step S32, it is judged based on the detection signals of the rear axle speed sensor 55 and the front axle speed sensor 56 whether or not the average rotational speed of the left and right rear axles 38 is greater than the average rotational speed of the left and right front axles 45. When judgment of step S32 is positive (YES in S32), it is judged in step S33 that slipping of the rear wheels 16 has been caused. Then, in step S34, the four-wheel drive is realized in which the front wheels 15 and the rear wheels 16 are driven by driving of both the electric motor 22 and the engine 21.

On the other hand, when the judgment of S32 is negative (NO in S32), the electric motor 22 is stopped and the engine 21 is driven, to realize the two-wheel drive of the rear wheels 16. With the completion of step S34 or S35, the control process during the slipping of the rear wheel is completed.

According to the structure of the present configuration, because the four-wheel drive (4WD) is realized with the judgment of the slipping of the rear wheels 16, the rough-road traveling capability of the vehicle can be improved. The other structures and operations in the present configuration are similar to those of the structure of FIG. 1~FIG. 7.

In the structure of FIG. 12~FIG. 14 or in the structure of FIG. 15, the numbers of the front wheels 15 and the rear wheels 16 of the vehicle are not limited to 2 wheels, and, for example, one of the front wheel and the rear wheel may be only one wheel attached at a center in the left-and-right direction of the vehicle body. For example, in the structure described above with reference to FIG. 15, if the rear wheel is one wheel, the rear axle is provided on a transmission path for transmitting the motive power of the engine 21 to the rear wheel, and the rear axle speed sensor detects a rotational speed of the rear wheel. The slipping of the rear wheel is judged when the rotational speed of the rear axle is greater than the average rotational speed of the left and right front axles. Similarly, in the structure described above with reference to FIG. 15, if the front wheel is one wheel, the front axle is provided on a transmission path for transmitting the motive power of the electric motor 22 to the front wheel, and the front axle speed sensor detects the rotational speed of the front axle. The slipping of the rear wheel is judged when the average rotational speed of the left and right rear axles is greater than the rotational speed of the front axle.

Figure 16:
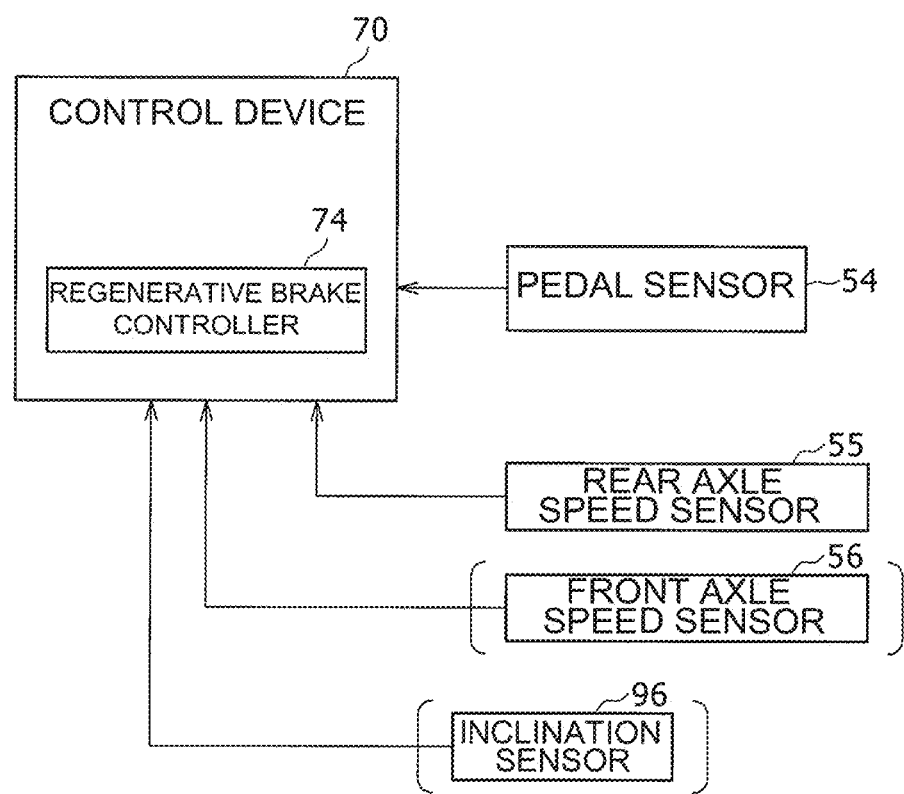
FIG. 16 is a block diagram showing an input for a control device and a structure of the control device in an alternative configuration of an embodiment of the present disclosure.
Figure 17:
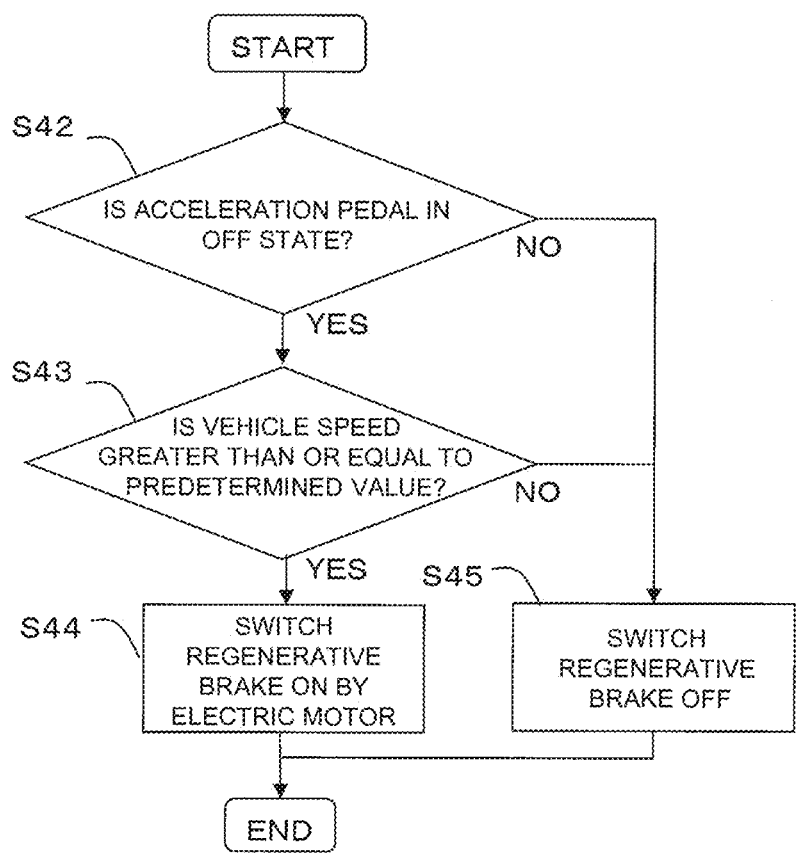
FIG. 17 is a flowchart showing a control method of a regenerative brake in an alternative configuration of an embodiment of the present disclosure.
Figure 18:
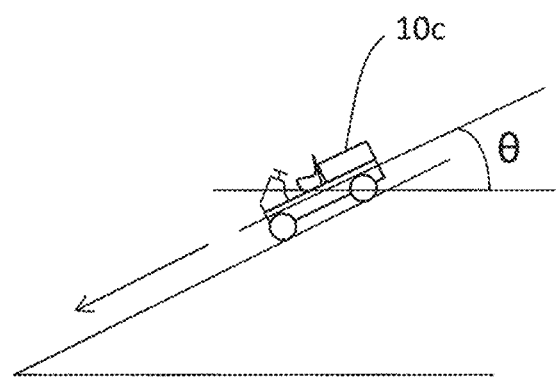
FIG. 18 is a diagram showing a state of a vehicle moving down an inclined road in an alternative configuration of an embodiment of the present disclosure.

FIG. 16 is a block diagram showing an input for the control device 70 and a structure of the control device 70 in an alternative configuration of an embodiment of the present disclosure. FIG. 17 is a flowchart showing a control method of a regenerative brake in the alternative configuration of the embodiment of the present disclosure. FIG. 18 is a diagram showing a state of a vehicle 10c moving down an inclined road in the alternative configuration of the embodiment of the present disclosure. A movable structure driving unit of the present configuration is a structure for improving a brake force when moving down a hill road and for improving an energy efficiency, in the structure of FIG. 1~FIG. 7. In the structure of FIG. 1~FIG. 7, with only the sandwiching of the brake disc by the brake pads by stepping-on of the brake pedal during the movement of the vehicle down the hill road, the amount of stepping-on of the brake pedal becomes large, and frequency of stepping-on is also increased. The structure of the present configuration to be described with reference to FIG. 16~FIG. 18 resolves such a disadvantage, and improves the energy efficiency.

As shown in FIG. 16, in the structure of the present configuration, the detection signals of the pedal sensor 54 and the rear axles speed sensor 55 are transmitted to the control device 70. The control device 70 has a regenerative brake controller 74. The regenerative brake controller 74 controls the motor driving circuit 24 (FIG. 5) of the electric motor 22 according to the received detection signals of the sensors 54 and 55, to cause the electric motor 22 to function as a power generator, and to recover the regenerative energy during the braking, with the electric motor 22. With this process, the regenerative brake force by the electric motor 22 is generated in the vehicle, and the regenerative energy recovered by the electric motor 22 is charged to the battery 23 (FIG. 5) as generated electric power. Specifically, the control device 70 causes the electric motor 22 (FIG. 2) to generate the regenerative brake force (switches the regenerative brake ON) regardless of the position of the drive switching switch 52, when the acceleration pedal is in the OFF state and the vehicle speed calculated based on the average rotational speed of the left and right rear axles is greater than or equal to a predetermined value.

A control method of the regenerative brake will now be described with reference to FIG. 17. In the following description, reference numerals of FIG. 2 and FIG. 16 will be used as suited. The control process of FIG. 17 is executed by the control device 70.

In step S42, it is judged based on the detection signal of the pedal sensor 54 whether or not the acceleration pedal 60 is in the OFF state. When judgment of step S42 is positive (YES in S42), it is judged in step S43 whether or not the vehicle speed is greater than or equal to a predetermined value. When judgment of step S43 is positive (YES in S43), the method proceeds to step S44. In step S44, the regenerative brake force is generated by the electric motor 22 (regenerative brake is switched ON).

On the other hand, when judgment of step S42 or S43 is negative (NO in S42 or S43), the generation of the regenerative brake in the electric motor 22 is stopped in step S45 (regenerative brake is switched OFF). With the completion of the processes of steps S44 and S45, the control process of the regenerative brake is completed.

According to the above-described structure, when the vehicle 10c moves down the hill road in the four-wheel drive as shown in FIG. 18, with the switching OFF of the acceleration pedal, the regenerative brake force by the electric motor 22 is generated, and the regenerative energy recovered by the electric motor 22 is charged to the battery as generated electric power. With this configuration, the braking force of the vehicle 10c traveling down the hill road can be increased, the amount of stepping-on of the brake pedal can be reduced, and the frequency of stepping-on can be reduced. In addition, because the generated electric power can be charged to the battery as the regenerative energy, the energy efficiency of the vehicle 10c can be improved. The other structures and operations in the present configuration are similar to those of the structure of FIG. 1~FIG. 7.

In the above-described configuration, the vehicle speed is calculated from the average rotational speed of the left and right rear axles. Alternatively, the average rotational speed of the left and right front axles may be determined based on the detection signal of the front axle speed sensor 56 (FIG. 16), and the vehicle speed may be calculated based on this average rotational speed.

Figure 19:
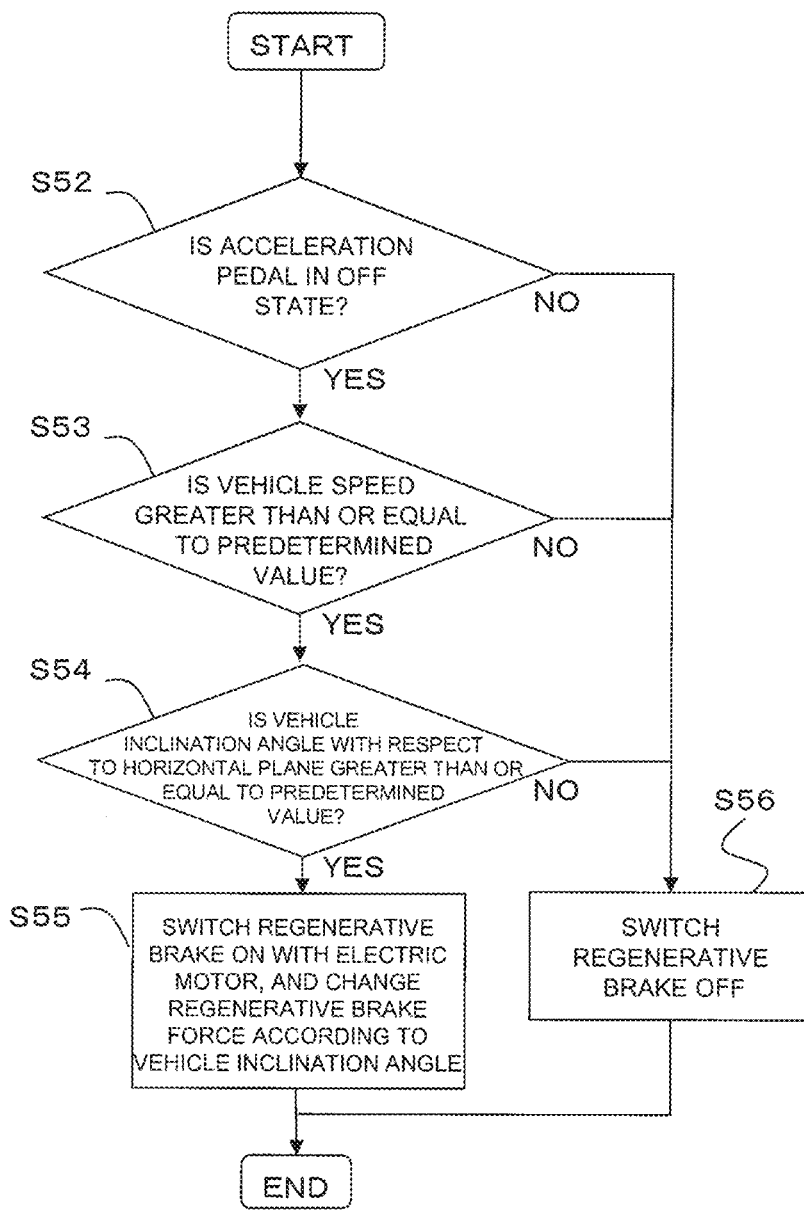
FIG. 19 is a flowchart showing a control method of a regenerative brake in an alternative configuration of an embodiment of the present disclosure.

FIG. 19 is a flowchart showing a control method of the regenerative brake in an alternative configuration of an embodiment of the present disclosure. In the structure of the present configuration, as shown in FIG. 16, in the structure of FIG. 16~FIG. 18, an inclination sensor 96 is connected to the control device 70. The inclination sensor 96 is attached to the vehicle body. The inclination sensor 96 detects a vehicle inclination angle θ (FIG. 18), which is an angle of a direction of travel of the vehicle with respect to a horizontal plane. The vehicle inclination angle θ is coincident with an inclination angle of the ground on which the vehicle is positioned, with respect to the horizontal plane. A detection signal indicating a detected value of the inclination sensor 96 is transmitted to the control device 70. The control device 70 causes the electric motor 22 (FIG. 2) to generate the regenerative brake force only when the vehicle inclination angle θ is greater than or equal to a predetermined value. In addition, the control device 70 in this case changes the regenerative brake force according to the vehicle inclination angle θ. Specifically, the control device 70 increases the regenerative brake force as the vehicle inclination angle θ becomes larger. With this configuration, it becomes easier to control the behavior of the vehicle during braking.

A control method of the regenerative brake will now be described with reference to FIG. 19. In the following, reference numerals of FIG. 2 and FIG. 16 will be used as suited. The control process of FIG. 19 is executed by the control device 70. Processes of steps S52~S53 are similar to the processes of steps S42~S43. After completion of the process of step S53, in step S54, it is judged whether or not the vehicle inclination angle θ with respect to the horizontal plane is greater than or equal to a predetermined value.

When judgment of step S54 is positive (YES in S54), the method proceeds to step S55. When the judgment of step S54 is negative (NO in S54), the regenerative brake is switched OFF in step S56. In step S55, the regenerative brake force is generated by the electric motor 22 (the regenerative brake is switched ON), and the regenerative brake force is changed according to the vehicle inclination angle θ. Specifically, as the vehicle inclination angle θ becomes larger, the regenerative brake force is set larger.

According to the above-described structure, because the regenerative brake force is generated by the electric motor 22 only when the vehicle inclination angle θ is greater than or equal to a predetermined value when the vehicle moves down an inclined road, the regenerative brake is not generated during a flat-ground travel which does not require a large brake force as compared to the inclined road. With this configuration, it becomes easier to control the behavior during braking of the vehicle in the flat-ground travel, with the operation of the brake pedal. The other structures and operations in the present configuration are similar to those of the structure of FIG. 1~FIG. 7.

Figure 20:
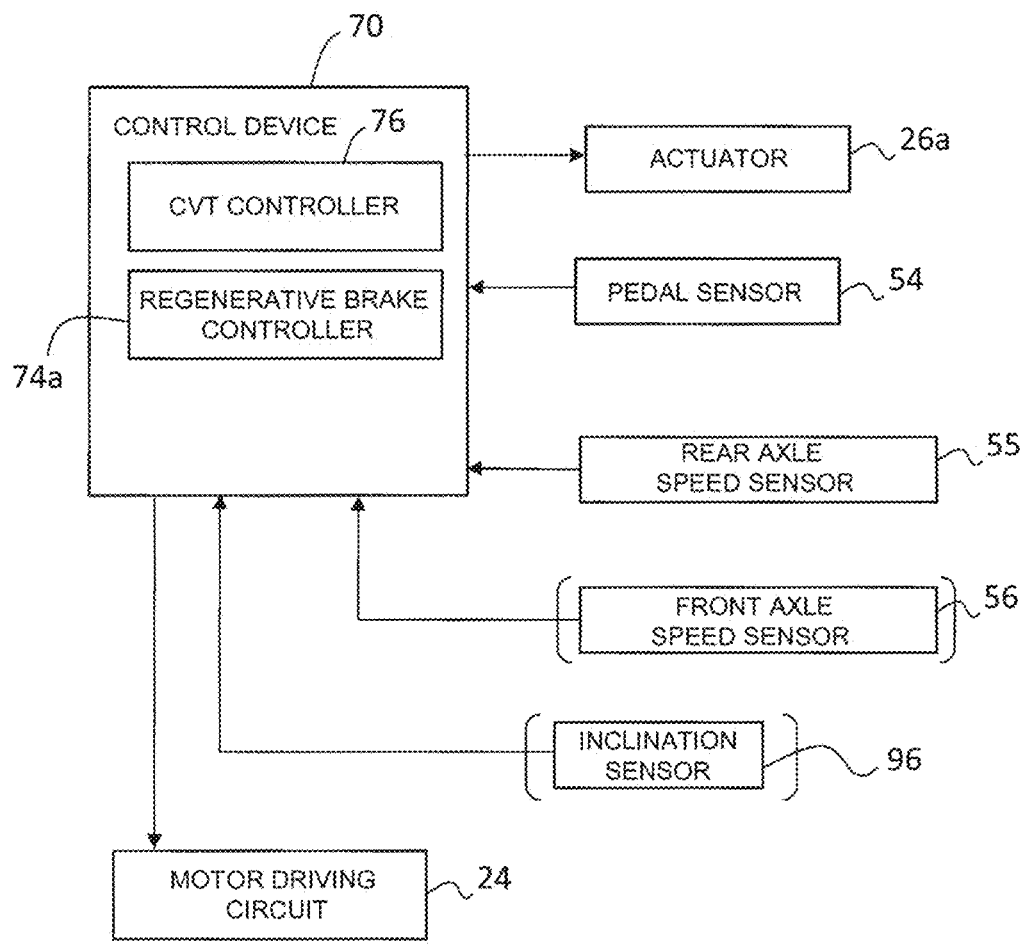
FIG. 20 is a block diagram showing an input for a control device and a structure of the control device in an alternative configuration of an embodiment of the present disclosure.
Figure 21:
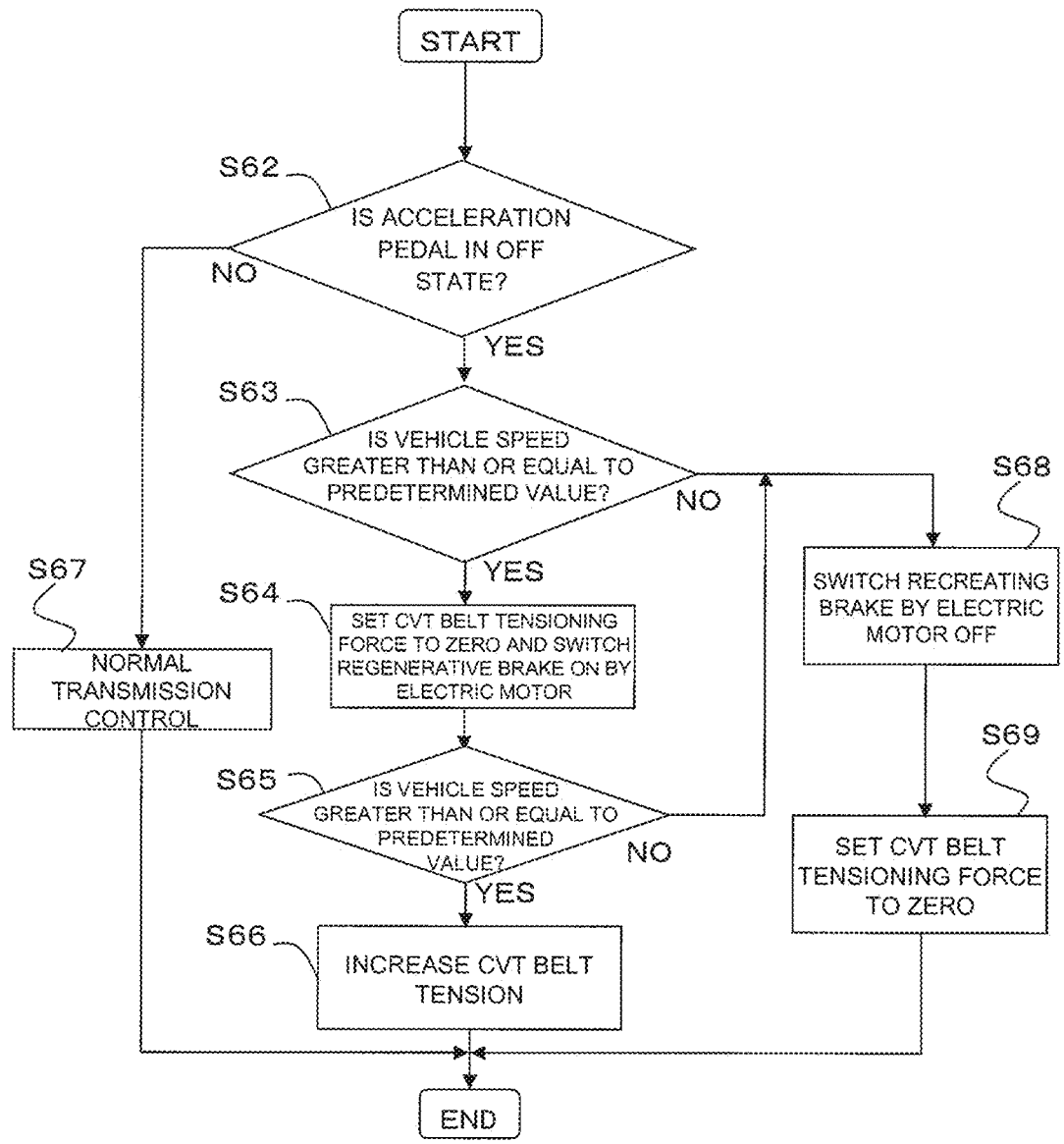
FIG. 21 is a flowchart showing a control method of a regenerative brake and a CVT in an alternative configuration of an embodiment of the present disclosure.

FIG. 20 is a block diagram showing an input and an output for the control device 70 and a structure of the control device 70 in an alternative configuration of an embodiment of the present disclosure. FIG. 21 is a flowchart showing a control method of the regenerative brake and the CVT in the alternative configuration of the embodiment of the present disclosure.

A structure of the present configuration is targeted to improving endurance of the belt in a vehicle which generates the regenerative brake force according to the vehicle speed, as in the structure of FIG. 16 and FIG. 17. For this purpose, in the structure of the present configuration, the control device 70 has a regenerative brake controller 74a and a CVT controller 76. The CVT controller 76 controls the driving of the actuator 26a which moves the movable sheave 27b (FIG. 3) of the CVT 26.

The control device 70 controls the motor driving circuit 24 by the regenerative brake controller 74a to generate the regenerative brake force by the electric motor 22 (FIG. 2) (regenerative brake is switched ON) when the acceleration pedal 60 (FIG. 1) is in the OFF state and a vehicle speed calculated from the average rotational speed of the left and right rear axles 38 (FIG. 2) is greater than or equal to a predetermined value. Along with this control, the control device 70 controls the actuator 26a with the CVT controller 76 to set the movable sheave 27b shown in FIG. 3 to be largely separated from the fixed sheave 27a, and to consequently set the tensioning force of the belt 29 to zero.

Further, when the vehicle speed continues to be greater than or equal to the predetermined value after the above-described process, the control device 70 controls the actuator 26a with the CVT controller 76, to move the movable sheave 27b of FIG. 3 closer to the fixed sheave 27a, to consequently increase the tensioning force of the belt 29.

A control method of the regenerative brake and the CVT will now be described with reference to FIG. 21. In the following, reference numerals of FIG. 2, FIG. 3, and FIG. 20 will be used as suited. The control process of FIG. 21 is executed by the control device 70.

In step S62, it is judged, based on the detection signal of the pedal sensor 54, whether or not the acceleration pedal 60 is in the OFF state. When judgment of step S62 is positive (YES in S62), it is judged in step S63 whether or not the vehicle speed is greater than or equal to a predetermined value. When judgment of step S63 is positive (YES in S63), the method proceeds to step S64. In step S64, the tensioning force of the belt of the CVT 26 is set to zero, and the regenerative brake force is generated by the electric motor 22 (the regenerative brake is switched ON).

Next, in step S65, it is again judged whether or not the vehicle speed is greater than or equal to the predetermined value. When judgment of step S65 is positive (YES in S65), the method proceeds to step S66. In step S66, the belt tensioning force of the CVT 26 is increased. With this process, the engine brake is activated along with the regenerative brake of the electric motor 22, and the vehicle can be more strongly braked. For example, when the inclination of the hill road on which the vehicle is moving down is large and the vehicle speed is not reduced with the regenerative brake alone, the vehicle can be more strongly braked with the engine brake.

Alternatively, between the steps S64 and S65, a step may be provided in which it is judged whether or not a predetermined time has elapsed after execution of step S64, and the method may proceed to step S65 only after the predetermined time has elapsed.

On the other hand, when the judgment of step S62 is negative (NO in S62), a normal transmission control of the CVT 26 is executed in step S67, and the process is completed. Moreover, when the judgment of step S63 or S65 is negative (NO in S63 or S65), the generation of the regenerative brake by the electric motor 22 is stopped in step S68 (the regenerative brake is switched OFF). Then, in step S69, the actuator 26a is controlled by the CVT controller 76 to largely separate the movable sheave 27b from the fixed sheave 27a so that the belt tensioning force of the CVT 26 is set to zero. In this case, the driver of the vehicle can brake the vehicle by sandwiching of the brake disc due to stepping-in of the brake pedal.

According to the above-described structure, when a strong brake force is needed, the brake force of the engine brake can be added to the brake force of the regenerative brake, and when the vehicle speed is reduced, the belt tensioning force of the CVT 26 is set to zero. Thus, it is not necessary to always generate the engine brake, and, consequently, the endurance of the belt 29 of the CVT 26 can be improved in a structure which can generate a strong brake force. The other structures and operations in the present configuration are similar to those of the structure of FIG. 1~FIG. 6 or the structure of FIG. 16 and FIG. 17.

Figure 22:
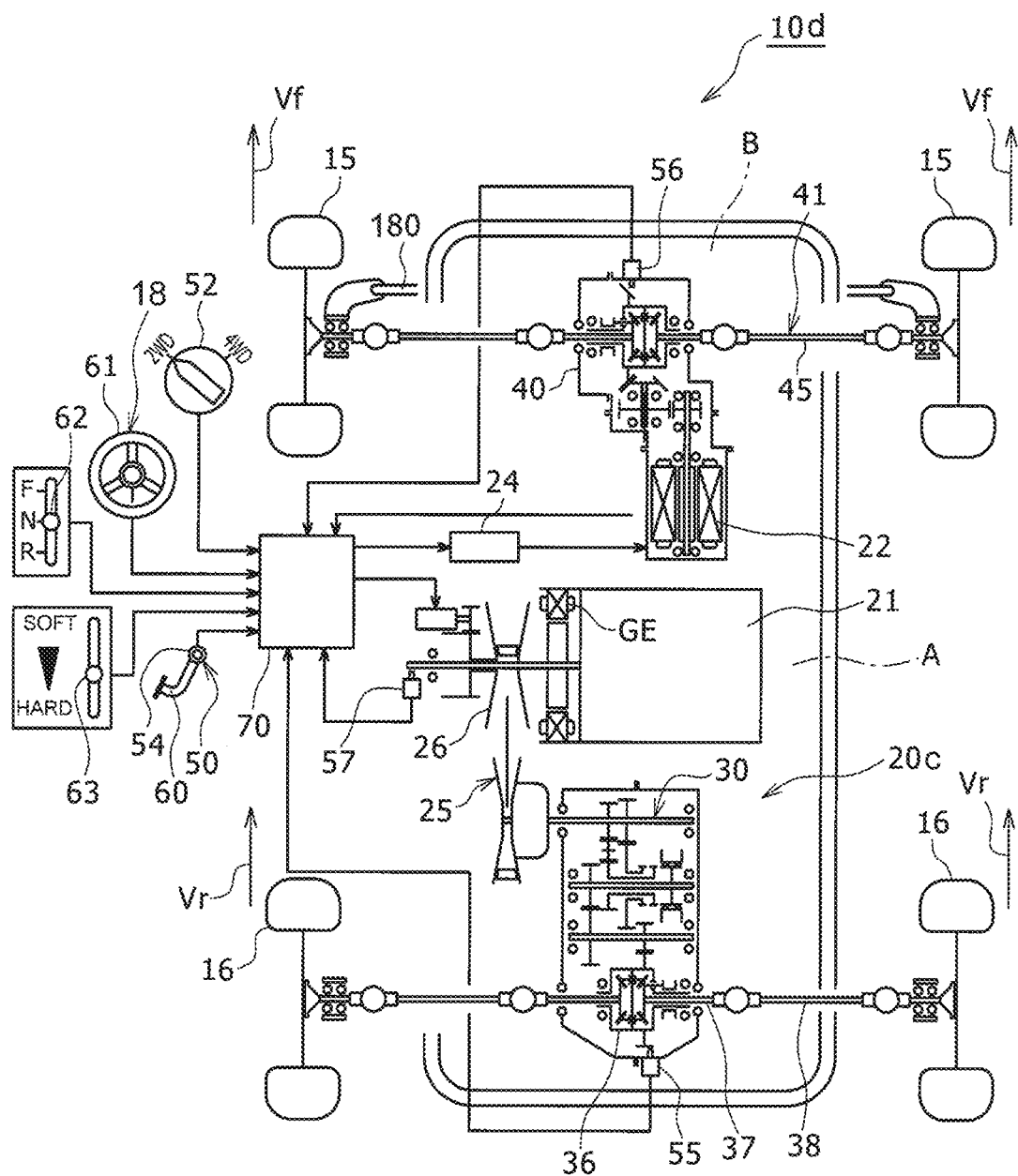
FIG. 22 is a diagram showing an overall structure of a movable structure driving unit in an alternative configuration of an embodiment of the present disclosure.
Figure 23:
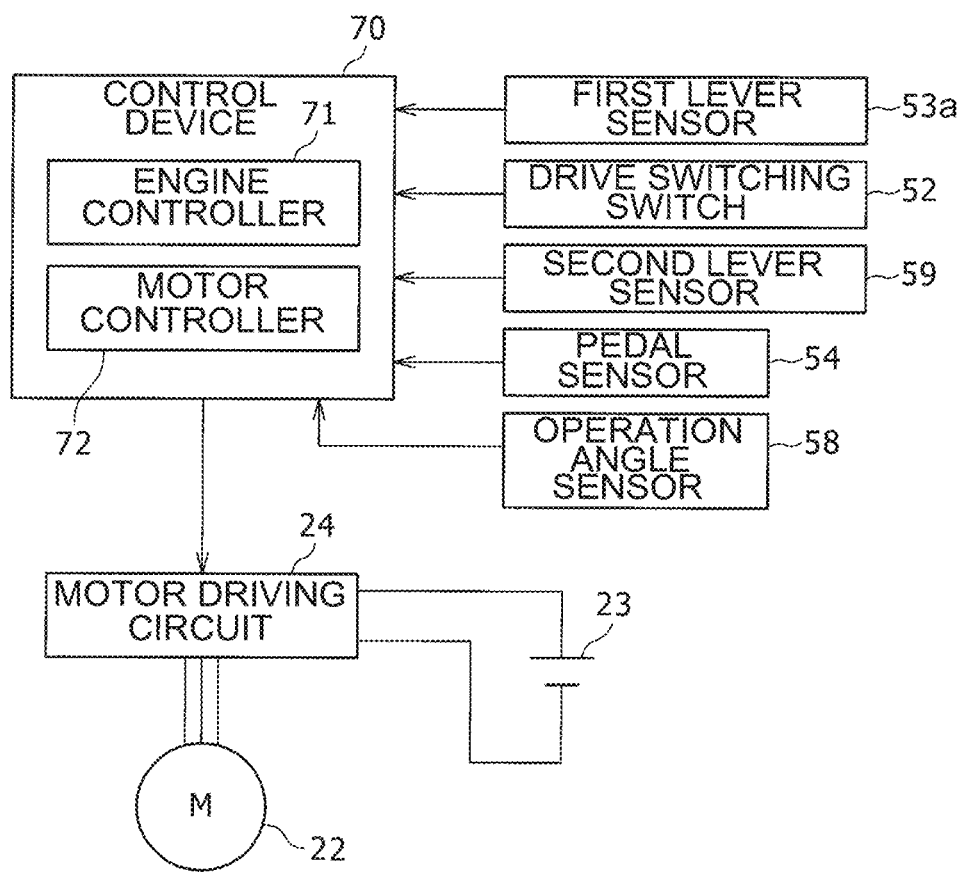
FIG. 23 is a diagram showing structures of a driving circuit of an electric motor and a control device in an alternative configuration of an embodiment of the present disclosure.

FIG. 22~FIG. 25 show an alternative configuration of an embodiment of the present disclosure. FIG. 22 is a diagram showing an overall structure of a movable structure driving unit 20c of the alternative configuration of the embodiment of the present disclosure. FIG. 23 is a diagram showing structures of a driving circuit of the electric motor 22 and the control device 70 in the alternative configuration of the embodiment of the present disclosure. In a vehicle 10d on which the movable structure driving unit 20c of FIG. 22 is mounted, outer sizes of the front wheels 15 and the rear wheels 16 are identical or approximately identical to each other. The engine 21 corresponds to a rear-side motive power source.

The sensor switch group 50 includes a first lever sensor 53a (FIG. 23), and a second lever sensor 59 (FIG. 23) to be described later. The first lever sensor 53a is formed similarly as the lever sensor 53 of the structure of FIG. 1~FIG. 7. The second lever sensor 59 detects an operation position of a mode lever 63 for instructing switching between a hard road surface mode and a soft road surface mode, as will be described later. The mode lever 63 forms the operation element group 18, and corresponds to a mode instructor.

The control device 70 applies a control to set the rotational speed of the front wheels 15 higher than the rotational speed of the rear wheels 16 when the four-wheel drive travel is instructed and the soft road surface mode is instructed by the operation of the mode lever 63, as will be described later. With this process, stability of the soft road surface travel by the vehicle of the four-wheel drive can be improved.

The steering operator 61 is connected to the pair of front wheels 15 at the left and right via a steering mechanism 180 of an Ackermann type, in a manner to allow steering of the front wheels 15.

The mode lever 63 is provided to instruct switching between the hard road surface mode at a display position of "hard" and the soft road surface mode at a display position of "soft." The "hard road surface mode" is a mode suited for travel on a hard road surface having a relatively high frictional force with the wheels, and the "soft road surface mode" is a mode suited for travel on a soft road surface having a relatively low frictional force with the wheels. The mode lever 63 is placed, for example, near the front cover 13 at a front side of the driver seat 14, and is supported on the vehicle body in a manner to allow swing. The second lever sensor 59 (FIG. 23) corresponds to the mode lever 63.

An operation angle sensor 58 (FIG. 23) detects an operation angle from a neutral position of the steering operator 61. The operation angle sensor 58 outputs, for example, a positive operation angle for a case where the steering operator 61 is rotated to the right from the neutral position, and a negative operation angle for a case where the steering operator 61 is rotated to the left from the neutral position. The relationship between the rotational directions of right and left and the positive and negative of the operation angle may alternatively be reversed. A detection signal of the operation angle sensor 58 is transmitted to the control device 70. With this configuration, the control device 70 can calculate an amount of turn of the steering operator 61.

In addition, the second lever sensor 59 (FIG. 23) detects a position of the mode lever 63, and transmits a detection signal thereof to the control device 70. The control device 70 changes the relationship between the rotational speeds of the rear wheel 16 and the front wheel 15 as will be described later, according to the road surface mode instructed by the mode lever 63.

The control device 70 has the engine controller 71 (FIG. 23) and the motor controller 72 (FIG. 23). The motor controller 72 changes the relationship between the rotational speeds of the rear wheels 16 and the front wheels 15 according to the road surface mode instructed by the mode lever 63. Specifically, the motor controller 72 controls the rotational speed of the electric motor 22, to match the rotational speed Vf of the front wheels 15 to the rotational speed Vr of the rear wheels 16, when the four-wheel drive is instructed by the drive switching switch 52 and the hard road surface mode is instructed by the mode lever 63. With this process, the front wheels 15 and the rear wheels 16 rotate at the same speed. Here, as the rotational speed Vr of the rear wheels 16, an average rotational speed Vrm of the pair of rear wheels 16 is used. The average rotational speed Vrm of the pair of rear wheels 16 is determined based on the detection signal which is transmitted from the rear axle speed sensor 55 to the control device 70. In addition, as the rotational speed Vf of the front wheels 15, an average rotational speed Vfm of the pair of the front wheels 15 is used. The average rotational speed Vfm of the pair of the front wheels 15 is determined based on the detection signal which is transmitted from the front axle speed sensor 56 to the control device 70.

On the other hand, when the soft road surface mode is instructed by the mode lever 63, the motor controller 72 controls the rotational speed of the electric motor 22 so as to set the rotational speed Vf of the front wheels 15 to be higher than the rotational speed Vr of the rear wheels 16. Similar to the instruction of the hard road surface mode, here also, as the rotational speed of the rear wheels 16, the average rotational speed of the pair of the rear wheels 16 is used. In addition, as the rotational speed of the front wheels 15, the average rotational speed of the pair of the front wheels 15 is used. In a state where the amount of turn of the steering operator 61 is zero; that is, when a straight movement is instructed, the rotational speed of the front wheels 15 is set to a value, for example, obtained by increasing the rotational speed of the rear wheel 16 by a predetermined ratio or by a predetermined amount.

Further, the motor controller 72 applies a control when the soft road surface mode is instructed by the mode lever 63, such that, as the amount of turn by the steering operator 61 is increased, the amount of increase of the average rotational speed Vfm of the pair of the front wheels 15 with respect to the average rotational speed Vrm of the pair of the rear wheels 16 is increased.

Figure 24:
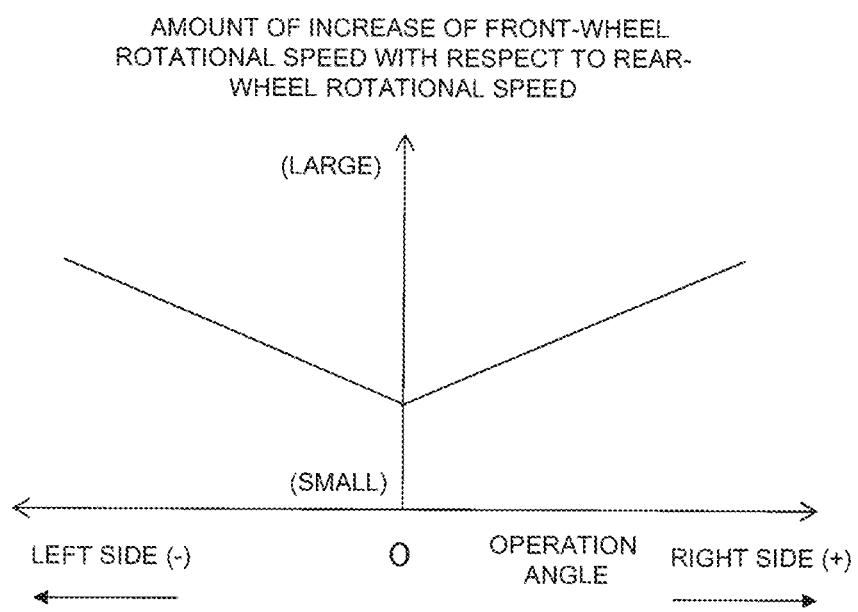
FIG. 24 is a diagram showing a relationship between an operation angle of a steering operator and an amount of increase of a rotational speed of a front wheel with respect to a rotational speed of a rear wheel when a soft road surface mode is instructed in an alternative configuration of an embodiment of the present disclosure.

FIG. 24 is a diagram showing a relationship between the operation angle of the steering operator 61 and the amount of increase of the front-wheel rotational speed with respect to the rear-wheel rotational speed when the soft road surface mode is instructed in the embodiment of the present disclosure. In the example structure of FIG. 24, as an absolute amount of the operation angle of the steering operator 61 is increased, the amount of increase of the rotational speed of the front wheels 15 with respect to the rotational speed of the rear wheels 16 is increased linearly. In addition, the relationship between the amount of increase and the operation angle is the same between the case where the steering operator 61 is rotated to the right and the case where the steering operator 61 is rotated to the left. Such a relationship between the operation angle of the steering operator 61 and the amount of increase of the front-wheel rotational speed with respect to the rear-wheel rotational speed is stored in the storage unit of the control device 70 in advance. The motor controller 72 controls the electric motor 22 according to the relationship stored in the storage unit, and to increase the amount of increase of the average rotational speed of the pair of the front wheels 15 with respect to the average rotational speed of the pair of the rear wheels 16, as the amount of turn described above is increased.

The relationship between the amount of increase of the front-wheel rotational speed with respect to the rear-wheel rotational speed and the operation angle described above is not limited to the example of FIG. 24. For example, the amount of increase of the rotational speed of the front wheels with respect to the rotational speed of the rear wheels may be increased in a curved line shape as the absolute amount of the operation angle is increased.

Figure 25:
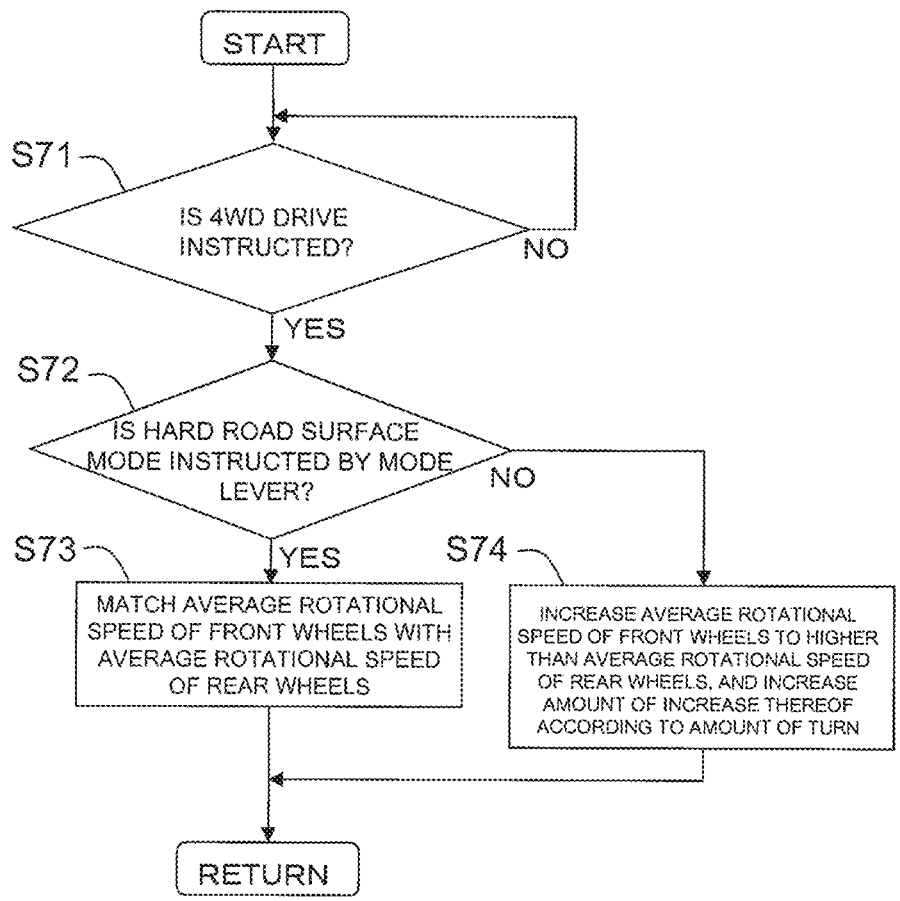
FIG. 25 is a flowchart showing a control method of driving of a front wheel and a rear wheel during four-wheel drive travel in an alternative configuration of an embodiment of the present disclosure.

FIG. 25 is a flowchart showing an example of a control process of the movable structure driving unit 20c having the above-described structure, and showing a control method of the driving of the front wheels 15 and the rear wheels 16 during travel with four-wheel drive. In the following, the reference numerals of FIG. 1, FIG. 22, and FIG. 23 will be used as suited. Processes of steps S71~S74 are executed by the motor controller 72. In step S71, it is judged whether or not there is an instruction of four-wheel drive. When it is judged that there is the instruction of four-wheel drive (YES in S71), in step S72, it is judged whether or not the hard road surface mode is instructed by the mode lever 63. When it is judged that the hard road surface mode is instructed (YES in S72), in step S73, the electric motor 22 is controlled so that the average rotational speed Vfm of the front wheels 15 matches the average rotational speed Vrm of the rear wheels 16. With this configuration, by the driver judging that the ground on which the vehicle is traveling or is about to travel is a hard road surface and switching the mode lever 63 to the hard road surface mode, a travel can be achieved in which the average rotational speeds of the front wheels 15 and the rear wheels 16 are matched. In this manner, wear of the wheels during the travel can be suppressed. When the vehicle travels on a location where the ground does not be wanted to be disturbed such as a lawn, the driver may instruct the hard road surface mode with the mode lever 63 to set the rotational speed difference between the front and rear wheels to zero, and to consequently suppress disturbance of the ground.

When the judgment of step S71 of FIG. 25 is negative (NO in S71), the process of step S71 is repeated. When the judgment of step S72 of FIG. 25 is negative (NO in S72); that is, when it is judged that the soft road surface mode is instructed by the mode lever 63, in step S74, the electric motor 22 is controlled such that the average rotational speed Vfm of the front wheels 15 is higher than the average rotational speed Vrm of the rear wheels 16. With this configuration, by the driver judging that the ground on which the vehicle is traveling or is about to travel is a soft road surface such as a swamp or damp ground, and switching the mode lever 63 to the soft road surface mode, the average rotational speed of the front wheels 15 can be set to be higher than the average rotational speed of the rear wheels 16. Because of this, in the travel of the soft road surface with four-wheel drive, the motive power of the front wheels 15 can be more easily transmitted to the ground, and swinging of the front wheels 15 can be suppressed. Therefore, because the vehicle can stably travel in a direction of travel intended by the driver such as a forward movement in a straight direction, the stability of the soft road surface travel can be improved according to the instruction of the driver.

Further, in step S74, the electric motor 22 is controlled so that the amount of increase of the average rotational speed Vfm of the front wheels 15 with respect to the average rotational speed Vrm of the rear wheels 16 is increased according to the amount of turn of the steering operator 61. With this configuration, when the orientation of the vehicle is to be changed by turning the steering operator 61, the vehicle can more easily move in the direction corresponding to the front wheels 15, resulting in easier turning. After completion of the processes of steps S73 and S74, the method returns to step S71 and the processes are repeated. Alternatively, in step S74, the amount of increase of the average rotational speed of the front wheels 15 with respect to the average rotational speed of the rear wheels 16 may be set invariable with the amount of turn of the steering operator 61.

In addition, in the above, a case is described in which the rotational speed of the electric motor 22 is controlled with the instruction of the soft road surface mode, such that the rotational speed of the front wheels 15 is set higher than the rotational speed of the rear wheels 16. On the other hand, as an alternative configuration, for example, with the instruction of the soft road surface mode, the control device 70 may control the CVT 26 so that the rotational speed of the rear wheels 16 is lower than the rotational speed of the front wheels 15 by setting a gear ratio of the CVT 26 higher than that in the case of the hard road surface mode. The other structures and operations in the present configuration are similar to those of the structure of FIG. 1~FIG. 7.

Figure 26:
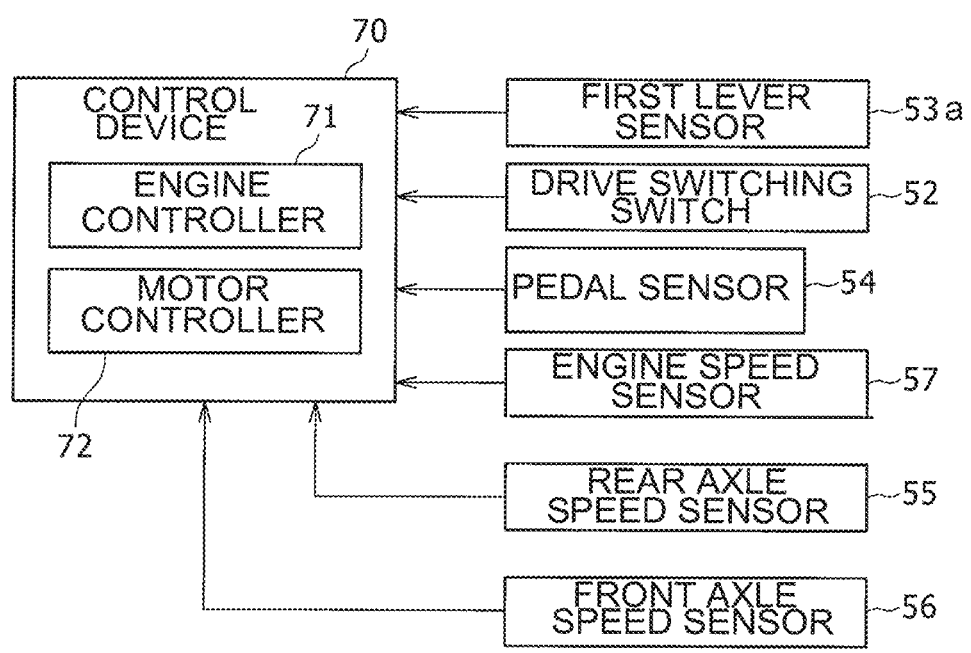
FIG. 26 is a block diagram showing an input for a control device and a structure of the control device in an alternative configuration of an embodiment of the present disclosure.

FIG. 26 is a block diagram showing an input for the control device 70 and a structure of the control device 70 in an alternative configuration of an embodiment of the present disclosure. A movable structure driving unit of the present configuration is a structure for smoothening start of travel of the vehicle in the structure of FIG. 22~FIG. 25.

As shown in FIG. 26, in the movable structure driving unit of the present configuration, detection signals of the first lever sensor 53a, the drive switching switch 52, the pedal sensor 54, the engine speed sensor 57, the rear axle speed sensor 55, and the front axle speed sensor 56 are transmitted to the control device 70.

In the present configuration, the control method during start of travel is similar to that of FIG. 13. The driving of the front wheels 15 and the rear wheels 16 is similar to that of FIG. 14. Further, the other structures and operations in the present configuration are similar to those of the structure of FIG. 22~FIG. 25 or the structure of FIG. 12~FIG. 14.

The structure of FIG. 22~FIG. 25 may be combined with the structure of FIG. 15, to achieve a structure which improves the rough road traveling capability.

In a structure in which the structure of FIG. 26 or the structure of FIG. 22 FIG. 25 is combined with the structure of FIG. 15, the numbers of wheels for the front wheels 15 and the rear wheels 16 of the vehicle are not limited to two wheels, respectively, and, for example, one of the front wheel and the rear wheel may be only one wheel attached to the vehicle body at a center in the left-and-right direction. For example, in a structure combined with FIG. 15, if the rear wheel is only one wheel, the rear axle is provided on a transmission path for transmitting the motive power of the engine 21 to the rear wheel, and the rear axle speed sensor detects the rotational speed of the rear axle. When the rotational speed of the rear axle is larger than the average rotational speed of the left and right front axles, the slipping of the rear wheel is judged. Alternatively, in a structure combined with FIG. 15, if the front wheel is only one wheel, the front axle is provided on a transmission path for transmitting the motive power of the electric motor 22 to the front wheel, and the front axle speed sensor detects the rotational speed of the front axle. When the average rotational speed of the left and right rear axles is larger than the rotational speed of the front axle, the slipping of the rear wheels is judged.

Alternatively, the structure of FIG. 22~FIG. 25 or the structure of FIG. 26 may be combined with the structure of FIG. 16~FIG. 17 to achieve a structure in which the brake force when the vehicle moves down a hill road is improved and the energy efficiency is improved. The state of the vehicle moving down the hill road is similar to that shown in FIG. 18.

Alternatively, the structure of FIG. 22~FIG. 25 or the structure of FIG. 26 may be combined with the structure of FIG. 19 to achieve a structure to control the regenerative brake.

Alternatively, the structure of FIG. 22~FIG. 25 or the structure of FIG. 26 may be combined with the structure of FIG. 20~FIG. 21 to achieve a structure in which the endurance of the belt is improved in a vehicle which generates the regenerative brake force according to the vehicle speed. In this case, the control device 70 includes the regenerative brake controller and the CVT controller. The CVT controller controls driving of the actuator 26a which moves the movable sheave 27b (FIG. 3) of the CVT.

In the configurations described above, the rear wheels 16 are driven by the engine 21, but alternatively, the rear wheels may be driven by a second electric motor serving as the rear-side motive power source. For example, the four-wheel drive is realized by driving of the electric motor 22 and the second electric motor.

Figure 27:
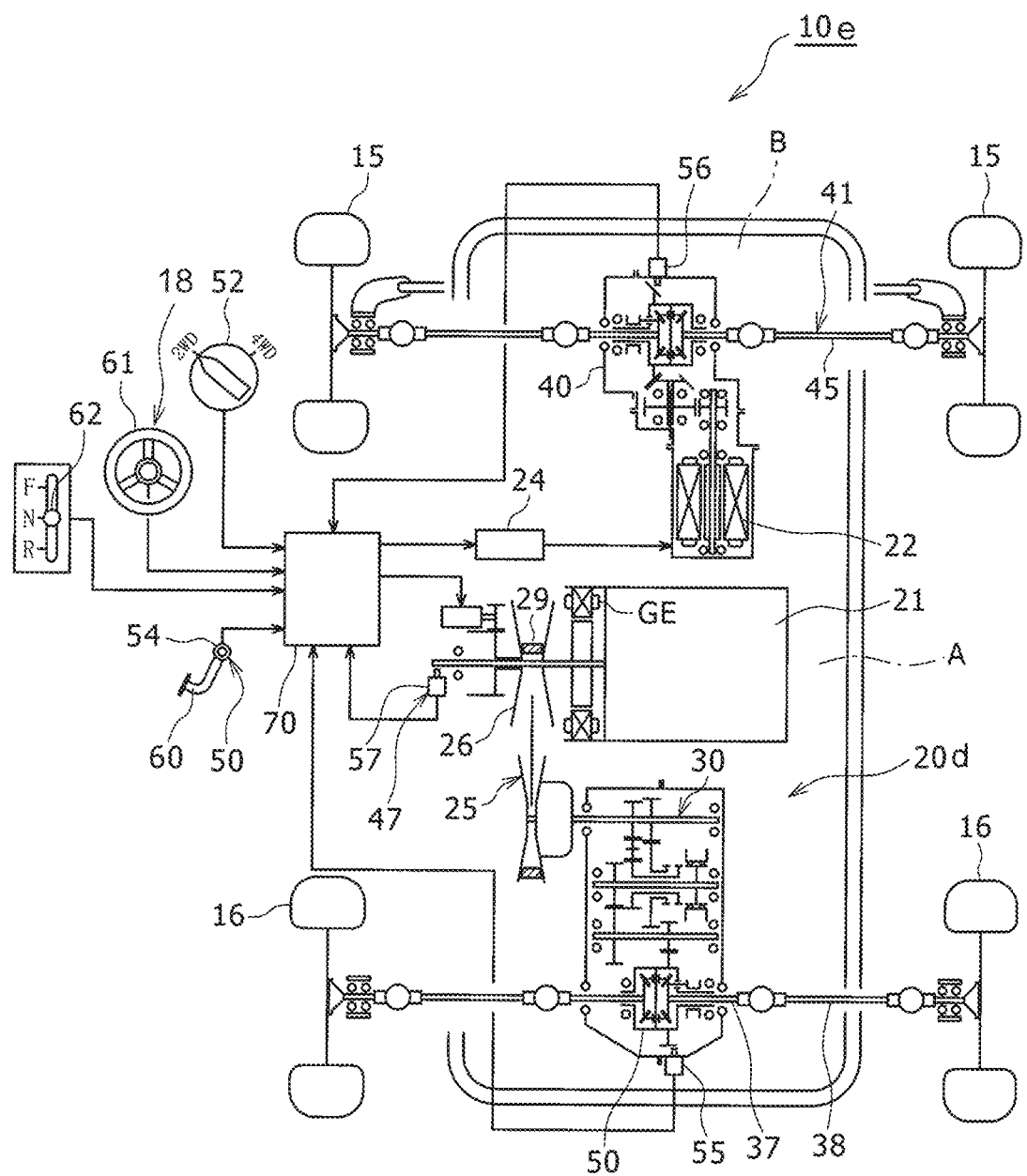
FIG. 27 is a diagram showing an overall structure of a movable structure driving unit in an alternative configuration of an embodiment of the present disclosure.
Figure 28:
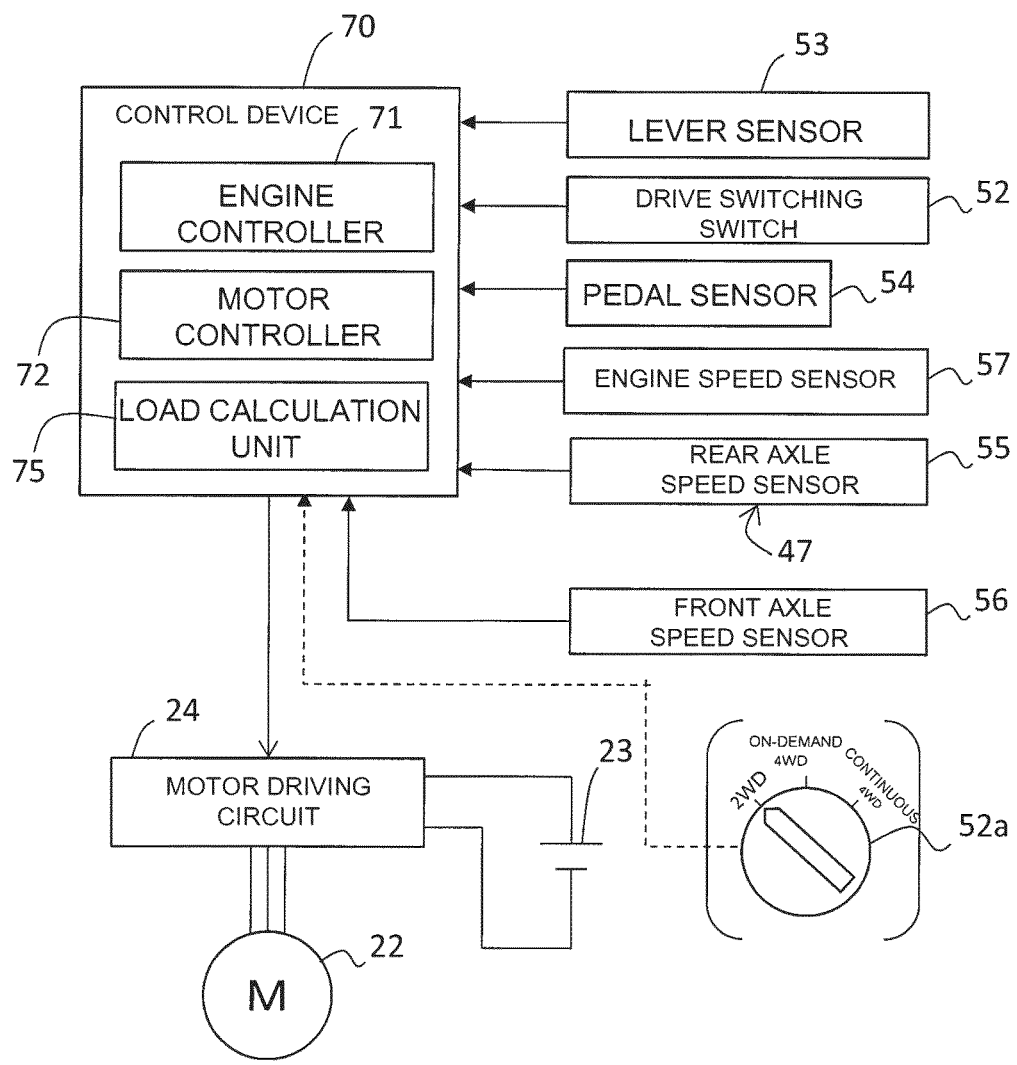
FIG. 28 is a diagram showing structures of a driving circuit of an electric motor and a control device in an alternative configuration of an embodiment of the present disclosure.

FIG. 27 is a diagram showing an overall structure of a movable structure driving unit 20d in an alternative configuration of an embodiment of the present disclosure. FIG. 28 is a diagram showing structures of a driving circuit of the electric motor 22 and the control device 70 in the alternative configuration of the embodiment of the present disclosure. In a vehicle 10e on which the movable structure driving unit 20d shown in FIG. 27 and FIG. 28 is mounted, outer sizes of the front wheels 15 and the rear wheels 16 are identical or approximately identical to each other. The front wheels 15 correspond to a first wheel, of a plurality of wheels, at a first side in a front-and-rear direction. The rear wheels 16 corresponds to a second wheel, of the plurality of wheels, at a second side in the front-and-rear direction.

The engine 21 corresponds to the rear-side motive power source. The sensor switch group 50 includes a load detector 47 to be described later. The load detector 47 detects a load of the engine 21. The control device 70 controls the electric motor 22 according to a detected value of the load detector 47.

The control device 70 drives the electric motor 22 to drive all of the front wheels 15 and the rear wheels 16 when the detected value of the load detector 47 becomes greater than or equal to a first predetermined value in a state where the two-wheel drive of the rear wheels 16 is instructed as will be described below. In this manner, stopping of engine due to excessive load can be prevented, and fuel consumption can be improved.

The CVT 26 is a belt CVT which achieves continuously variable transmission by changing an amount of tension of the belt by an electric actuator. The differential device 43 corresponds to a differential device.

As shown in FIG. 27 and FIG. 28, the sensor switch group 50 includes the lever sensor 53 (FIG. 28) corresponding to the forward/rearward movement lever 62, the drive switching switch 52, and the pedal sensor 54. The pedal sensor 54 corresponds to a first detector. The sensor switch group 50 also includes the rear axle speed sensor 55, the front axle speed sensor 56, and the engine speed sensor 57.

The drive switching switch 52 is provided to be operable by the driver on a drive panel on which the forward/rearward movement lever 62 protrudes, and instructs a drive state of the vehicle by an operation.

The rear axle speed sensor 55 corresponds to a third detector. The average rotational speed of a pair of the rear axles 38 at the left and right matches the average rotational speed of the two rear wheels 16 at the left and right. A detection signal of the rear axle speed sensor 55 is input to the control device 70. The rear axle speed sensor 55 corresponds to a detector which detects a rotational speed of a first wheel.

The average rotational speed of the pair of the front axles 45 at the left and right matches the average rotational speed of the two front wheels 15 at the left and right. A detection signal of the front axle speed sensor 56 is input to the control device 70. The front axle speed sensor 56 corresponds to a detector which detects a rotational speed of a second wheel. The engine speed sensor 57 corresponds to a second detector.

As shown in FIG. 28, the control device 70 has the engine controller 71, the motor controller 72, and a load calculation unit 75.

The load calculation unit 75 calculates the load of the engine 21 based on a combination of a part or all of the detected values of the pedal sensor 54, the engine speed sensor 57, and the rear axle speed sensor 55. For example, the load calculation unit 75 calculates the load of the engine 21 based on the detected value of the amount of operation of the acceleration pedal 60 detected by the pedal sensor 54 and the detected value of the engine speed sensor 57. For example, when the detected value of the engine speed sensor 57 is lower than that in a normal time in relation to the detected value of the pedal sensor 54, the calculated value of the engine load would be high. Alternatively, the load calculation unit 75 may calculate the load of the engine 21 based on the detected value of the pedal sensor 54 and the average rotational speed of the pair of the rear wheels 16 detected by the rear axle speed sensor 55. For example, when the detected value of the rear axle speed sensor 55 is lower than that in a normal time in relation to the detected value of the pedal sensor 54, the calculated value of the engine load would be high. The load detector 47 is formed including the pedal sensor 54, the engine speed sensor 57, the rear axle speed sensor 55, and the load calculation unit 75. The load calculation unit 75 may calculate the vehicle speed based on the detected value of the rear axle speed sensor 55, and may calculate the engine load using the calculated value of the vehicle speed and the detected value of the pedal sensor 54 or the engine speed sensor 57.

The motor controller 72 drives the electric motor 22 when the detected value of the load detector 47 becomes greater than or equal to a first predetermined value in a state where the two-wheel drive is instructed in which the driving of the front wheels 15 by the electric motor 22 is stopped and the rear wheels 16 are driven by the engine 21. With this process, the motor controller 72 drives all of the front wheels 15 and the rear wheels 16, to realize four-wheel drive.

Figure 29:
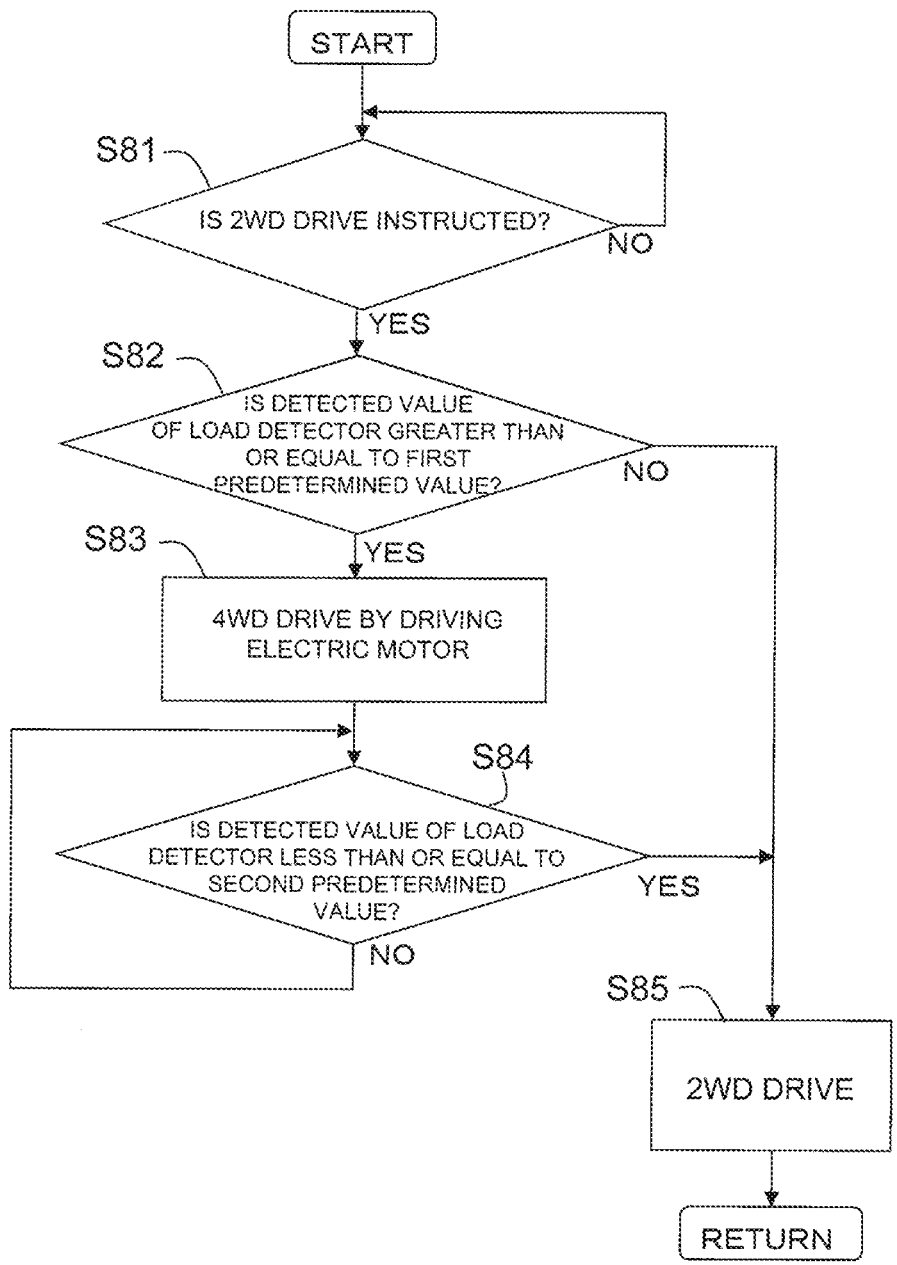
FIG. 29 is a flowchart showing a method of controlling an electric motor according to a load of an engine in an alternative configuration of an embodiment of the present disclosure.

FIG. 29 is a flowchart showing an example of a control process of the movable structure driving unit 20d having the above-described structure, and showing a method of controlling the electric motor 22 according to the load of the engine 21. In the following, the reference numerals of FIG. 1, FIG. 27, and FIG. 28 will be used as suited. Processes of steps S81~S85 are executed by the control device 70. In step S81, it is judged whether or not there is an instruction of two-wheel drive (2WD). When it is judged that there is the instruction of the two-wheel drive (YES in S81), in step S82, the load of the engine 21 is calculated by the load calculation unit 75, and the motor controller 72 judges whether or not the detected value of the load detector 47 is greater than or equal to a first predetermined value. When it is judged that the detected value of the load detector 47 is greater than or equal to the first predetermined value (YES in S82), the method proceeds to step S83. In step S83, the four-wheel drive is realized in which the motor controller 72 drives the electric motor 22 so that all of the front wheels 15 and the rear wheels 16 are driven. With this configuration, because the electric motor 22 assists the travel of the vehicle 10e when the load of the engine 21 is high in the vehicle which drives the rear wheels 16 by the engine 21, stopping of the engine due to excessive load can be prevented and fuel consumption can be improved.

After the four-wheel drive is started in step S83, the method proceeds to S84. In S84, the motor controller 72 judges whether or not the detected value of the load detector 47 became lower than or equal to a second predetermined value lower than the first predetermined value. When judgment of step S84 is positive (YES in S84), in step S85, the driving of the electric motor 22 is stopped. With this process, the vehicle returns from the four-wheel drive state in which all of the front wheels 15 and the rear wheels 16 are driven to the two-wheel drive state in which only the rear wheels 16 are driven. Because of this, the electric motor 22 is stopped when the load of the engine 21 is reduced, and the electric power consumption of the battery 23 can thus be suppressed.

On the other hand, when the judgment of step S81 of FIG. 29 is negative (NO in S81), the process of step S81 is repeated. In addition, when the judgment of step S84 is negative (NO in S84), the process of step S84 is repeated. Further, when the judgment of step S82 is negative (NO in S82); that is, when the detected value of the load detector 47 is not greater than or equal to the first predetermined value, the two-wheel drive of the rear wheels 16 is executed in S85.

In the above description, a case is described in which the load calculation unit 75 calculates the load of the engine 21 from a combination of a part or all of the detected values of the pedal sensor 54, the engine speed sensor 57, and the rear axle speed sensor 55. Alternatively, the load calculation unit 75 may have a structure in which the load of the engine 21 is calculated from a combination of a part or all of the detected values of the pedal sensor 54, the engine speed sensor 57, and the front axle speed sensor 56 (FIG. 28). The load calculation unit 75 may calculate the vehicle speed based on the detected value of the front axle speed sensor 56, and may calculate the engine load using the calculated value of the vehicle speed and the detected value of the pedal sensor 54 or the engine speed sensor 57. The other structures and operations in the present configuration are similar to those of the structure of FIG. 1~FIG. 7.

An alternative configuration of an embodiment of the present disclosure will now be described with reference to FIG. 28. In the structure of the present configuration, as shown in FIG. 28, the movable structure driving unit has a drive switching switch 52*a* in place of the drive switching switch 52 (FIG. 27).

The drive switching switch 52*a* is provided in a manner to be operable by the driver, and instructs a drive state of the vehicle with the operation. Specifically, with the operation of the drive switching switch 52*a*, the instruction is switched among an instruction to set the vehicle in the two-wheel drive (2WD) state, an instruction to set the vehicle in the four-wheel drive state according to request of the driver (on-demand 4WD), and an instruction to set the vehicle always in the four-wheel drive state (continuous 4WD). The instruction of the two-wheel drive state of the drive switching switch 52*a* and the instruction of the four-wheel drive state according to the request of the driver are similar to the instruction of the two-wheel drive state and the instruction of the four-wheel drive state of the drive switching switch 52 in the structure described above with reference to FIG. 27~FIG. 29.

On the other hand, when the drive switching switch 52*a* is switched to the state of the continuous four-wheel drive state by the operation of the driver, the motor controller 72 is configured to continuously drive the electric motor 22 regardless of the detection of the load detector 47. The other structures and operations in the present configuration are similar to those of the structure described above with reference to FIG. 27~FIG. 29.

Figure 30:
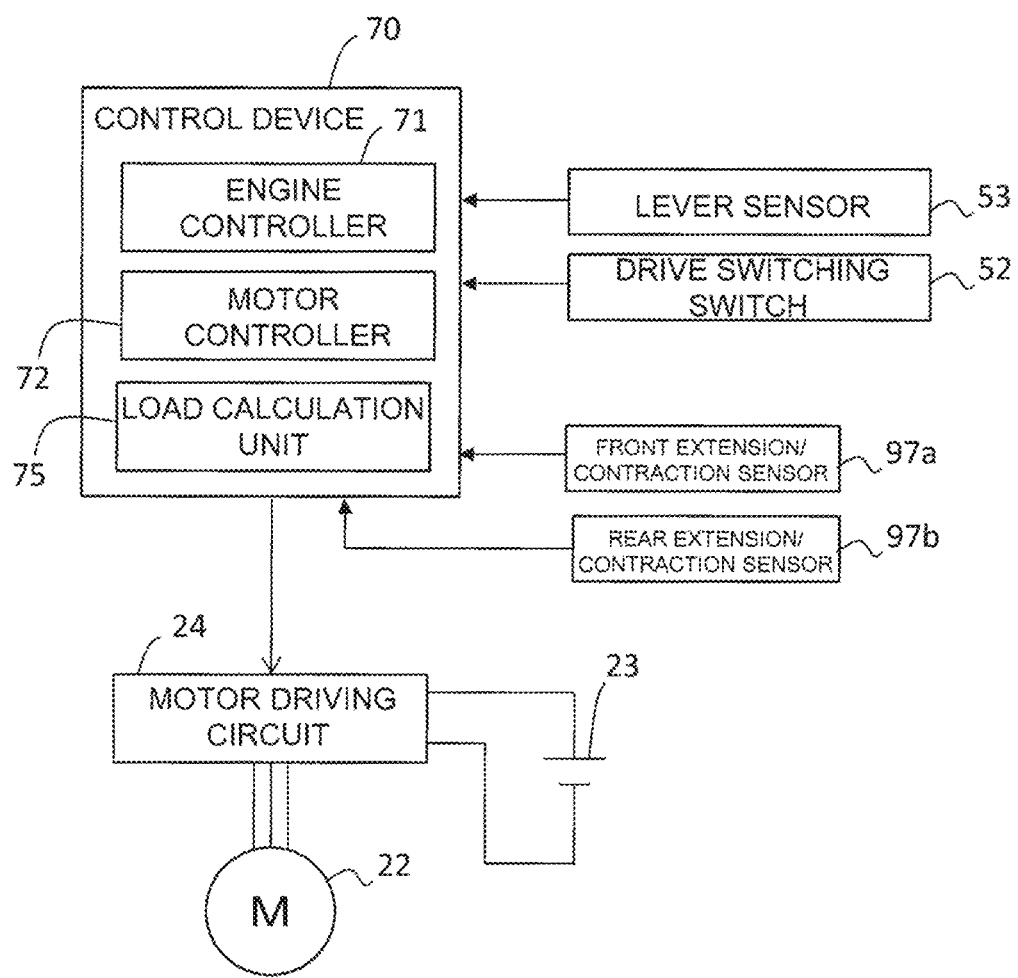
FIG. 30 is a block diagram showing an input for a control device and a structure of the control device in an alternative configuration of an embodiment of the present disclosure.
Figure 31:
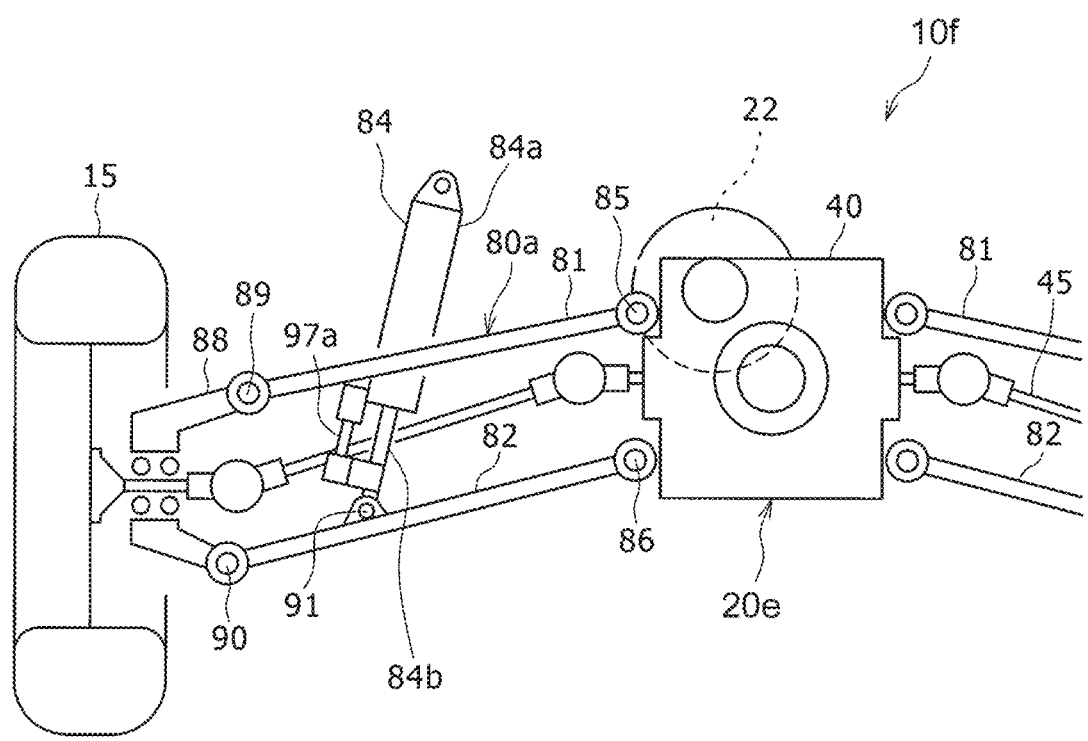
FIG. 31 is a diagram showing a suspension device and an extension/contraction detector for a right front wheel in an alternative configuration of an embodiment of the present disclosure, as viewed from a front side of the vehicle and with a portion omitted.
Figure 32:
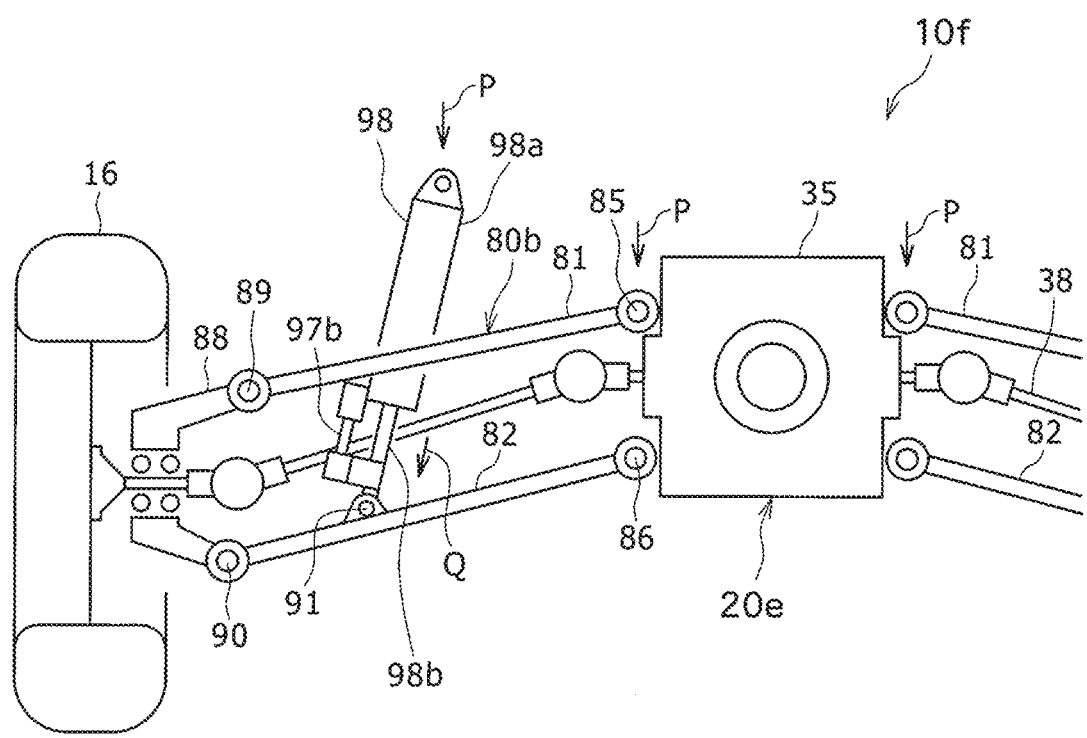
FIG. 32 is a diagram showing a suspension device and an extension/contraction detector for a right rear wheel in an alternative configuration of an embodiment of the present disclosure, as viewed from a front side of the vehicle and with a portion omitted.

FIG. 30 is a block diagram showing an input for the control device 70 and a structure of the control device 70 in an alternative configuration of an embodiment of the present disclosure. FIG. 31 is a diagram showing a suspension device 80*a* and a front extension/contraction sensor 97*a* for a right front wheel 15 in the alternative configuration of the embodiment of the present disclosure, as viewed from the front side of the vehicle, and with a portion omitted. FIG. 32 is a diagram showing a suspension device 80*b* and a rear extension/contraction sensor 97*b* for a right rear wheel 16 in the alternative configuration of the embodiment of the present disclosure, as viewed from the front side of the vehicle, and with a portion omitted.

In the structure of the present configuration, a movable structure driving unit 20*e* (FIG. 31 and FIG. 32) comprises the front extension/contraction sensor 97*a* and the rear extension/contraction sensor 97*b*. The front extension/contraction sensor 97*a* detects a degree of extension/contraction of the suspension device 80*a* (FIG. 31) at the front side of a vehicle 10*f* (FIG. 31, FIG. 32). The rear extension/contraction sensor 97*b* detects a degree of extension/contraction of the suspension device 80*b* (FIG. 32) at the rear side of the vehicle 10*f*. The front extension/contraction sensor 97*a* corresponds to a first extension/contraction detector, and the rear extension/contraction sensor 97*b* corresponds to a second extension/contraction detector.

Specifically, as shown in FIG. 31, each of the front wheels 15 is supported on the vehicle body via the suspension device 80*a* at the front side. The suspension device 80*a* includes a plurality of arms 81 and 82, and a rod-cylinder unit 84 which extends and contracts. The plurality of arms 81 and 82 are placed separated in upper and lower sides in each of left and right sides, and inner ends, in the width direction of the vehicle, of the arms 81 and 82 are supported on the frame 11 (FIG. 1), in a rotatable manner about axes 85 and 86 along the front-and-rear direction. Outer ends, in the width direction of the vehicle, of the arms 81 and 82 are supported on an upper end and a lower end of a wheel support unit 88 which rotatably supports the front wheel 15, in a rotatable manner about axes 89 and 90 along the front-and-rear direction.

The rod-cylinder unit 84 includes a cylinder case 84*a* and a rod 84*b* which extends from a lower side of the cylinder case 84*a*. A lower end of the rod 84*b* is connected to the arm 82 at the lower side in a rotatable manner about an axis 91 along the front-and-rear direction. An upper end of the cylinder case 84*a* is connected to a portion (not shown) of the frame 11 (FIG. 1) in a rotatable manner about an axis along the front-and-rear direction. An upper end of the rod 84*b* is connected to a piston (not shown) in the cylinder case 84*a*. Oil or air is sealed between the cylinder and the piston in the cylinder case 84*a*.

The front extension/contraction sensor 97*a* is connected between the cylinder case 84*a* and the lower end of the rod 84*b*, and detects a degree of extension/contraction of the suspension device 80*a* based on a change of a protrusion length of the rod 84*b* from the cylinder case 84*a*. A detection signal of the front extension/contraction sensor 97*a* is transmitted to the control device 70 (FIG. 30).

As shown in FIG. 32, each of the rear wheels 16 is supported on the vehicle body via the suspension device 80*b* at the rear side. The structure of the suspension device 80*b* is similar to the structure of the suspension device 80*a* (FIG. 31).

The rear extension/contraction sensor 97*b* is connected between a cylinder case 98*a* of a rod-cylinder unit 98 of the suspension device 80*b* and a lower end of a rod 98*b*, and detects a degree of extension/contraction of the suspension device 80*b* based on a change of a protrusion length of the rod 98*b* from the cylinder case 98*a*. A detection signal of the rear extension/contraction sensor 97*b* is transmitted to the control device 70 (FIG. 30).

The load calculation unit 75 of the control device 70 detects the load of the engine 21 based on a change in relationship between the detected values of the front extension/contraction sensor 97a and those of the rear extension/contraction sensor 97b. Specifically, when a large number of pieces of luggage are carried on the carriage 19 (FIG. 1) of the vehicle, the rear side of the vehicle body is significantly lowered as compared to the front side, as shown by an arrow P in FIG. 32. With this process, the upper end of the cylinder case 98a and the axis 86, of the arm 82 at the lower side, on the vehicle body side, of the suspension device 80b at the rear side are significantly lowered. In this process, due to a difference between an inclination angle of the rod-cylinder unit 98 with respect to a vertical direction and an inclination angle of the arm 82 with respect to the vertical direction, the length of the rod-cylinder unit 98 is significantly reduced, as shown by an arrow Q in FIG. 32. Thus, the rod-cylinder unit 98 of the suspension device 80b is significantly contracted in comparison to the rod-cylinder unit 84 of the suspension device 80a. Therefore, the amount of luggage can be calculated from the relationship of the degrees of extension/contraction of the rod-cylinder units 84 and 98 at the front and the rear, and, consequently, the load calculation unit 75 can detect the load of the engine 21 by a calculation based on this relationship. The control device 70 stores in the storage unit in advance the relationship between the relationship between the degrees of extension/contraction of the rod-cylinder units 84 and 98 at the front and the rear, and the load of the engine 21.

The motor controller 72 drives the electric motor 22 to switch the vehicle to the four-wheel drive when the load of the engine 21 detected in the manner described above becomes greater than or equal to a first predetermined value in a case where the two-wheel drive of the rear wheel 16 by driving of the engine 21 is instructed. The other structures and operations in the present configuration are similar to those of the structure of FIG. 1~FIG. 7 or those of the structure of FIG. 27~FIG. 29.

Alternatively, the structure of FIG. 27~FIG. 29 or the structure of FIG. 30 FIG. 32 may be combined with the structure of FIG. 12~FIG. 14, to realize a structure for smoothening the start of travel of the vehicle.

In this case, the control method at the start of travel is similar to that of FIG. 13. The driving of the front wheels 15 and the rear wheels 16 is similar to that of FIG. 14. The other structures and operations in the present configuration are similar to those of the structure of FIG. 27~FIG. 29, the structure of FIG. 30~FIG. 32, or the structure of FIG. 12~FIG. 14.

Alternatively, the structure of FIG. 27~FIG. 29 or the structure of FIG. 30 FIG. 32 may be combined with the structure of FIG. 15, to realize a structure for improving the rough road traveling capability.

In the structure of FIG. 27~FIG. 29 or the structure of FIG. 30~FIG. 32, or a structure in which each of these structures is combined with the structure of FIG. 12~FIG. 14 or the structure of FIG. 15, each of the front wheels 15 and the rear wheels 16 of the vehicle is not limited to two wheels, and for example, one of the front wheel and the rear wheel may be only one wheel attached at the center in the left and right direction of the vehicle body. For example, in the structure combined with the structure of FIG. 15, if the rear wheel is to be set as one wheel, the rear axle is provided on a transmission path for transmitting the motive power of the engine 21 to the rear wheel, and the rear axle speed sensor detects the rotational speed of the rear axle. The slipping of the rear wheel is judged when the rotational speed of the rear axle is higher than the average rotational speed of the front axles at the left and right. Similarly, in the structure combined with the structure of FIG. 15, if the front wheel is to be set as one wheel, the front axle is provided on a transmission path for transmitting the motive power of the electric motor 22 to the front wheel, and the front axle speed sensor detects the rotational speed of the front axle. The slipping of the rear wheel is judged when the average rotational speed of the rear axle at the left and right is higher than the rotational speed of the front axle.

Alternatively, the structure of FIG. 271~FIG. 29 or the structure of FIG. 30 FIG. 32 may be combined with the structure of FIG. 16~FIG. 17, to realize a structure for improving the brake force when moving down the hill road and for improving the energy efficiency. The state of the vehicle moving down the hill road is similar to that shown in FIG. 18.

Alternatively, the structure of FIG. 27~FIG. 29 or the structure of FIG. 30 FIG. 32 may be combined with the structure of FIG. 19, to realize a structure for controlling the regenerative brake.

Alternatively, the structure of FIG. 27~FIG. 29 or the structure of FIG. 30 FIG. 32 may be combined with the structure of FIG. 20~FIG. 21, to realize a structure in which, in a vehicle which generates the regenerative brake force according to the vehicle speed, the endurance of the belt is improved. In this case, the control device 70 has the regenerative brake controller and the CVT controller. The CVT controller controls driving of the actuator 26a which moves the movable sheave 27b (FIG. 3) of the CVT 26.

Figure 33:
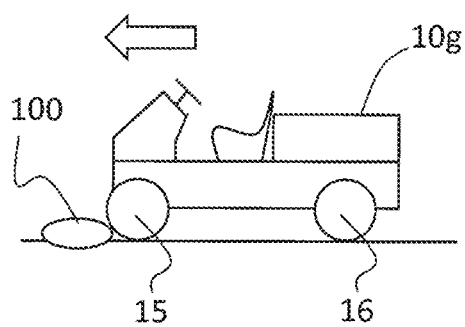
FIG. 33 is a diagram showing a disadvantage caused by an obstacle during forward movement of a vehicle.

Next, two alternative configurations of an embodiment of the present disclosure will be described. The structures of the two alternative configurations are targeted to preventing disadvantages caused in a vehicle 10g by an obstacle 100 shown in FIG. 33 and FIG. 34, respectively. The disadvantages will first be described with reference to FIG. 33 and FIG. 34. FIG. 33 is a diagram showing a disadvantage caused by the obstacle 100 during the forward movement of the vehicle 10g. When the vehicle 10g is moving forward by the driving of the front wheel 15 and the rear wheel 16 in a direction of an arrow shown in FIG. 33, there may be a case where one of both of the front wheels 15 comes in contact with the obstacle 100. A load is then applied to the front wheel 15, and an excessively large load may be caused in the front-side motive power transmission unit 41 (FIG. 27) which drives the front wheels 15.

Figure 34:
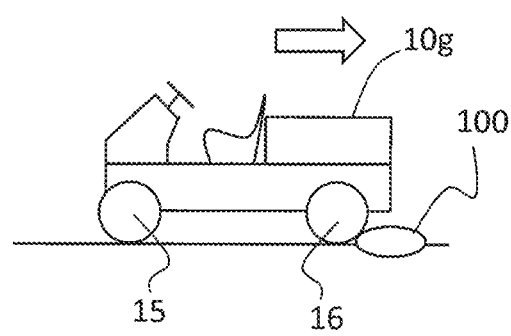
FIG. 34 is a diagram showing a disadvantage caused by an obstacle during rearward movement of a vehicle.

FIG. 34 shows a disadvantage caused by the obstacle 100 during a rearward movement of the vehicle 10g. When the vehicle 10g is moving rearward by driving of the front wheels 15 and the rear wheels 16 in a direction of an arrow shown in FIG. 34, there may be a case where one or both of the rear wheels 16 comes in contact with the obstacle 100. A load is then applied to the rear wheel 16, and an excessive large load may be caused in the rear-side motive power transmission unit 25 (FIG. 27) which drives the rear wheels 16.

Figure 35:
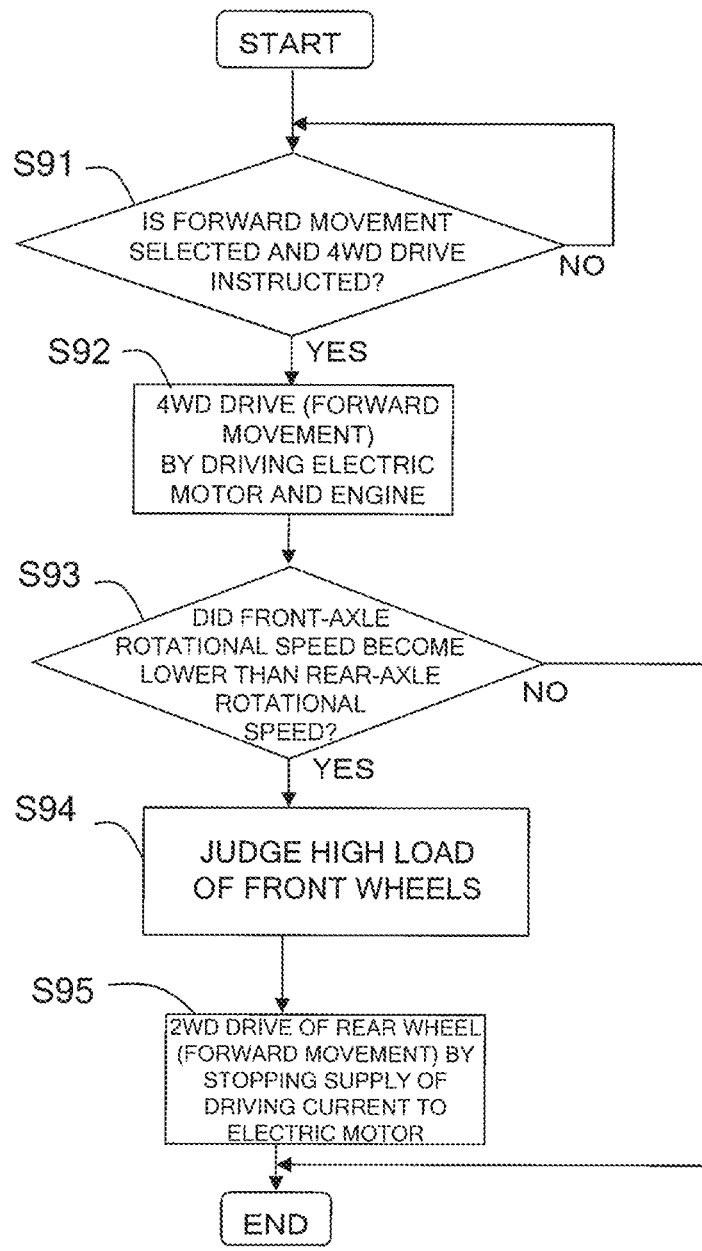
FIG. 35 is a flowchart showing a control method of an electric motor and an engine in an alternative configuration of an embodiment of the present disclosure.

FIG. 35 is a flowchart showing a control method of the electric motor 22 and the engine 21 in the alternative configuration for preventing the disadvantage shown in FIG. 33. In the following, the reference numerals of FIG. 1 and FIG. 27~FIG. 29 will be used as suited. A control process of FIG. 35 is executed by the control device 70. In step S91, it is judged whether or not the forward movement is selected by the forward/rearward movement lever 62, and the four-wheel drive (4WD) is instructed by the drive switching switch 52. When judgment of step S91 is positive (YES in S91), the method proceeds to step S92. When the judgment of step S91 is negative (NO in S91), the method returns to a state before step S91, and the process is repeated.

In step S92, both of the electric motor 22 and the engine 21 are driven, to realize the four-wheel drive of the forward movement. In this process, the electric motor 22 receives a detection result of the lever sensor 53 (FIG. 28) and causes the front axle 45 to rotate in a direction corresponding to the forward movement, and, at the gear transmission device 30 (FIG. 27), the rear axle 38 (FIG. 27) is rotated in a direction corresponding to the forward movement.

In step S93, it is judged, based on the detection signals of the rear axle speed sensor 55 and the front axle speed sensor 56, whether or not the average rotational speed of the left and right front axles 45 became lower than the average rotational speed of the left and right rear axles 38. When judgement of step S93 is positive (YES in S93), the rotational speed of the front wheels 15 became lower than the rotational speed of the rear wheels 16, and it is judged in step S94 that a high load is caused in the front wheels 15. Then, in step S95, the supply of the driving current to the electric motor 22 is stopped, so that the two-wheel drive of the forward movement is realized in which only the rear wheels 16, of the front wheels 15 and the rear wheels 16, are driven.

On the other hand, when the judgment of step S93 is negative (NO in S93), the process according to the load of the front wheels 15 is completed with the four-wheel drive of the forward movement maintained.

According to the structure of the present configuration, even when one or both of the front wheels 15 comes in contact with the obstacle 100 and the load of the front-side motive power transmission unit 41 is about to increase, the increase of the load can be suppressed by the stopping of the electric motor 22. With such a structure, the front-side motive power transmission unit 41 can be protected. The other structures and operations in the present configuration are similar to those of the structure of FIG. 27~FIG. 29.

Figure 36:
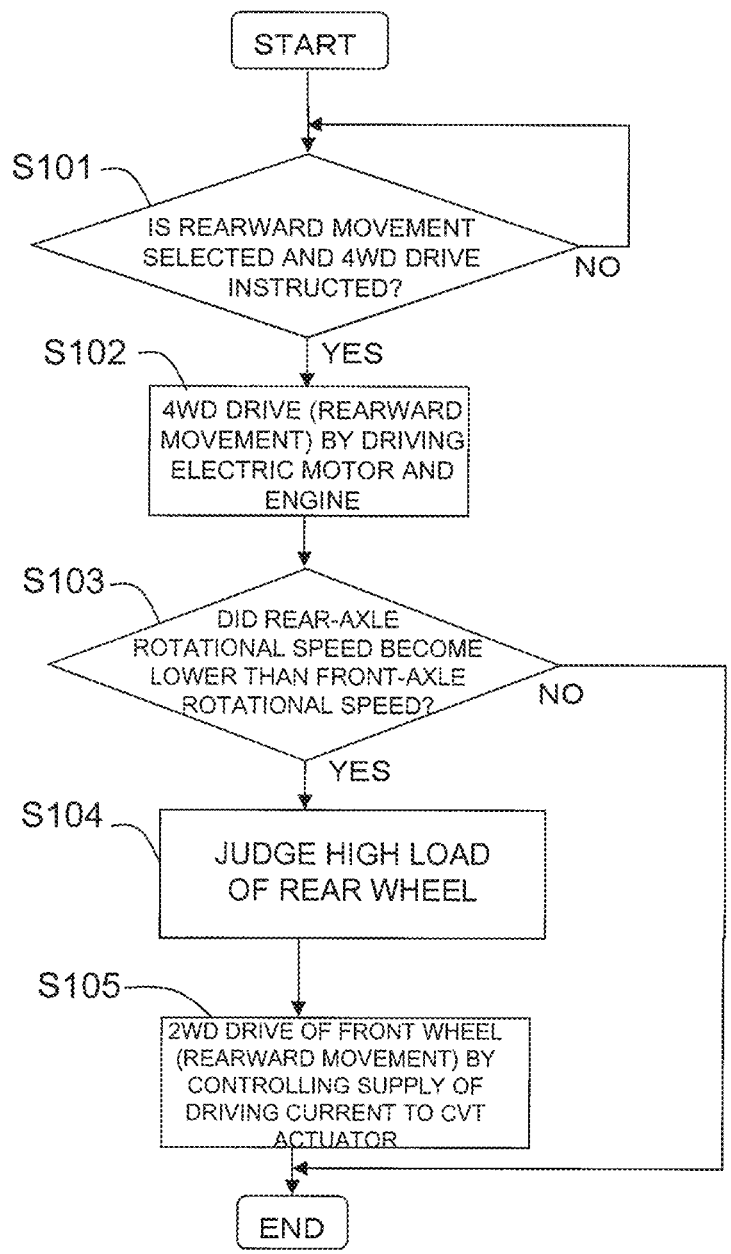
FIG. 36 is a flowchart showing a control method of an electric motor, an engine, and a CVT in an alternative configuration of an embodiment of the present disclosure.

FIG. 36 is a flowchart showing a control method of the electric motor 22 and the engine 21 in the alternative configuration for preventing the disadvantage shown in FIG. 34. In the following, the reference numerals of FIG. 1 and FIG. 27~FIG. 29 will be used as suited. A control process of FIG. 36 is executed by the control device 70. In step S101, it is judged whether or not the rearward movement is selected by the forward/rearward movement lever 62, and the four-wheel drive (4WD) is instructed by the drive switching switch 52. When judgment of S101 is positive (YES in S101), the method proceeds to step S102. When the judgment of S101 is negative (NO in S101), the method returns to a state before step S101 and the process is repeated.

In step S102, both of the electric motor 22 and the engine 21 are driven, to realize the four-wheel drive of the rearward movement. In this process, the electric motor 22 causes the front axle 45 to rotate in a direction corresponding to the rearward movement, and, at the gear transmission device 30 (FIG. 27), the rear axle 38 (FIG. 27) is rotated in a direction corresponding to the rearward movement.

In step S103, it is judged based on the detection signals of the rear axle speed sensor 55 and the front axle speed sensor 56 whether or not the average rotational speed of the left and right rear axles 38 is lower than the average rotational speed of the left and right front axles 45. When judgement of step S103 is positive (YES in S103), the rotational speed of the rear wheels 16 became lower than the rotational speed of the front wheel 15, and it is judged in step S104 that a high load is caused in the rear wheels 16. In step S105, the supply of the driving current to the actuator 26a of the CVT 26 is controlled so that the tensioning force of the belt 29 of the CVT 26 is reduced to zero. With this process, the motive power transmission between the rear wheels 16 and the engine 21 is suspended. Thus, the two-wheel drive of the rearward movement is realized in which only the front wheels 15, of the front wheels 15 and the rear wheels 16, are driven.

When the judgment of step S103 is negative (NO in S103), the process according to the load of the rear wheels 16 is completed with the four-wheel drive of the rearward movement maintained.

According to the structure of the present configuration, even when one or both of the rear wheels 16 comes in contact with the obstacle 100 (FIG. 34) and the load of the rear-side motive power transmission unit 25 is about to increase, because the motive power of the engine 21 is not transmitted to the rear wheels 16, the increase of the load can be suppressed. Thus, the rear-side motive power transmission unit 25 can be protected. The other structures and operations in the present configuration are similar to those of the structure of FIG. 27~FIG. 29.

In the structures of FIG. 27~FIG. 32, FIG. 35, and FIG. 36, a case is described in which the front wheels are driven by the electric motor and the rear wheels are driven by the engine. Alternatively, in the structures of FIG. 27~FIG. 32, FIG. 35, and FIG. 36, a configuration may be employed in which the front wheels are driven by the engine and the rear wheels are driven by the electric motor. In this case, the rear wheels correspond to the first wheel and the front wheels correspond to the second wheel.

A movable structure driving unit according to at least one of the embodiments described above has the movable structure driving unit of the first structure described above or the movable structure driving unit of the second structure described above. Because of this, the increases in the size and the cost of the driving mechanism which drives the front wheel can be suppressed, and the driving mechanism of the front wheels can be protected regardless of the jump during travel.

A movable structure driving unit according to at least one of the embodiments described above has the movable structure driving unit of the third structure described above. Because of this, the rotational speed of the front wheels is set to be higher than the rotational speed of the rear wheels when the user instructs the soft road surface mode by the mode instructor, and, consequently, the stability of the soft road surface travel by the movable structure of the four-wheel drive can be improved according to the instruction of the user.

A movable structure driving unit according to at least one of the embodiments described above is the movable structure driving unit of the third structure described above, wherein the front wheels and the rear wheels are formed as a pair of the front wheels and a pair of the rear wheels, each connected with interposing a differential device, the rotational speed of the front wheels is an average rotational speed of the pair of the front wheels, and the rotational speed of the rear wheels is an average rotational speed of the pair of the rear wheels.

A movable structure driving unit according to at least one of the embodiments described above further comprises a turn instructor that instructs turning of the movable structure, and a steering mechanism that changes directions of the pair of the front wheels according to the instruction by the turn instructor, wherein the control device applies a control such that, when a soft road surface mode is instructed by the mode instructor, an amount of increase of the average rotational speed of the pair of the front wheels with respect to the average rotational speed of the pair of the rear wheels is increased as an amount of turn by the turn instructor is increased.

A movable structure driving unit according to at least one of the embodiments described above has the movable structure driving unit of the fourth structure described above. Because of this, in the movable structure which drives the wheels by the engine, the electric motor assists the travel of the movable structure when the load of the engine is high, and thus, stopping of the engine due to excessive load can be prevented and fuel consumption can be improved.

A movable structure driving unit according to at least one of the embodiments described above is the movable structure driving unit of the fourth structure described above, wherein the motor controller is configured to be able to continuously drive the electric motor regardless of detection of the load detector, by an operation of the user.

A movable structure driving unit according to at least one of the embodiments described above is the movable structure driving unit of the fourth structure described above, wherein, the load detector comprises a first detector which detects an amount of operation of an acceleration instructor for instructing acceleration by an operation of a user, a second detector which detects a rotational speed of the engine, a third detector which detects a rotational speed of the second wheel or the first wheel, and a load calculation unit which calculates a load of the engine by a combination of a part or all of detected values of the first detector, the second detector, and the third detector.

In a movable structure driving unit according to at least one of the embodiments describe above, the second wheel or the first wheel is formed as a pair of the second wheels or a pair of the first wheels connected with interposing a differential device, and a rotational speed of the second wheel or the first wheel is an average rotational speed of the pair of the second wheels or the pair of the first wheels.

A movable structure driving unit according to at least one of the embodiments described above is the movable structure driving unit of the fourth structure, wherein the load detector includes a first extension/contraction detector which detects a degree of extension/contraction of a suspension device which supports the first wheel, a second extension/contraction detector which detects a degree of extension/contraction of a suspension device which supports the second wheel, and a load calculation unit which calculates a load of the engine based on a change of relationship between detected values of the first extension/contraction detector and the second extension/contraction detector.

A movable structure driving unit according to at least one of the embodiments described above is the movable structure driving unit of the fourth structure, wherein the motor controller returns the vehicle from a state in which all of the first wheel and the second wheel is driven to a state in which only the second wheel is driven, when the detected value of the load detector becomes greater than or equal to a first predetermined value and then becomes lower than or equal to a second predetermined value smaller than the first predetermined value.

A movable structure driving unit according to at least one of the embodiments described above is the movable structure driving unit of the fourth structure, further comprising a detector that detects each of the rotational speeds of the first wheel and the second wheel, wherein, when the rotational speed of the first wheel becomes lower than the speed of the second wheel in a state where all of the first wheel and the second wheel is driven, a supply of a driving current to the electric motor is stopped.

In a movable structure driving unit according to at least one of the embodiments described above, the second wheel and the engine are connected to each other with interposing a belt CVT which continuously variable transmits by changing an amount of tension of the belt by an electric actuator, and, when the rotational speed of the second wheel becomes lower than the speed of the first wheel in a state in which all of the first wheel and the second wheel is driven, supply of a driving current to the electric actuator is controlled to reduce a tensioning force of the belt, and to consequently disconnect the motive power transmission between the second wheel and the engine.

The invention claimed is:

1. A movable structure driving unit used for a movable structure having a front wheel and a rear wheel, comprising:
    an electric motor that is electrically connected to a power supply and that drives the front wheel;
    a rear-side motive power source that drives the rear wheel;
    a jump detector that detects a jump of the front wheel from ground; and
    a motor controller that controls driving of the electric motor, wherein
    during all of the front wheel and the rear wheel are instructed to be simultaneously driven, the motor controller stops supply of a driving current from the power supply to the electric motor when the jump of the front wheel from the ground is detected.

2. The movable structure driving unit according to claim 1, wherein
    the front wheel is supported on a vehicle body via a suspension device including a rod-cylinder unit which extends and contracts; and
    the jump detector detects the jump when an amount of extension of the rod-cylinder unit with respect to a reference length is greater than or equal to a predetermined value.

3. The movable structure driving unit according to claim 1, wherein
    the front wheel is supported on a vehicle body via a suspension device including an arm;
    a direction of a surface to be detected of the arm with respect to a reference direction of the surface to be detected of the arm changes according to a vertical movement of the vehicle body; and
    the jump detector detects the jump when the arm is lowered toward the front wheel and an angle between the reference direction and the direction of the surface to be detected of the arm is greater than or equal to a predetermined value.

4. The movable structure driving unit according to claim 1, wherein
    the movable structure comprises a driven wheel which rotates by a force received from the ground,
    the movable structure driving unit further comprises:
    a motive power transmission unit connected between the electric motor and the front wheel in a manner to allow transmission of motive power from the electric motor to the front wheel, and that includes a motive power transmitting rotational structure; and
    a first rotational speed detector that detects a rotational speed of the motive power transmitting rotational structure, and
    the jump detector comprises:
    a second rotational speed detector which detects a rotational speed of the driven wheel; and
    a jump judgment unit which detects the jump when a vehicle speed calculated based on the rotational speed of the motive power transmitting rotational structure is higher than a vehicle speed calculated based on the rotational speed of the driven wheel by a predetermined amount or greater or by a predetermined ratio or greater.

5. The movable structure driving unit according to claim 1, wherein
the motor controller re-starts supply of the driving current from the power supply to the electric motor after a predetermined time has elapsed with no detection of the jump after the jump is detected and the supply of the driving current is stopped.

6. The movable structure driving unit according to claim 2, wherein
the motor controller re-starts supply of the driving current from the power supply to the electric motor after a predetermined time has elapsed with no detection of the jump after the jump is detected and the supply of the driving current is stopped.

7. The movable structure driving unit according to claim 3, wherein
the motor controller re-starts supply of the driving current from the power supply to the electric motor after a predetermined time has elapsed with no detection of the jump after the jump is detected and the supply of the driving current is stopped.

8. The movable structure driving unit according to claim 4, wherein
the motor controller re-starts supply of the driving current from the power supply to the electric motor after a predetermined time has elapsed with no detection of the jump after the jump is detected and the supply of the driving current is stopped.

9. A movable structure driving unit used for a movable structure having a front wheel and a rear wheel, comprising:
an electric motor that is electrically connected to a power supply and that drives the front wheel;
a rear-side motive power source that drives the rear wheel;
a detector that detects a change of a weight of a part of the movable structure, acting on a suspension device from above; and
a motor controller that controls driving of the electric motor, wherein
during all of the front wheel and the rear wheel are instructed to be simultaneously driven, the motor controller stops supply of a driving current from the power supply to the electric motor when an amount of reduction of the weight detected by the detector is greater than or equal to a predetermined value.

10. The movable structure driving unit according to claim 9, wherein
the motor controller re-starts the supply of the driving current from the power supply to the electric motor after a predetermined time has elapsed after the amount of reduction of the weight detected by the detector is lowered to less than a predetermined value after the amount of reduction of the weight detected by the detector becomes a predetermined value or greater and the supply of the driving current is stopped.

* * * * *